US012444275B1

(12) United States Patent
Bowling, Jr. et al.

(10) Patent No.: US 12,444,275 B1
(45) Date of Patent: Oct. 14, 2025

(54) CARD-BASED ELECTRONIC GAMING SYSTEMS AND TECHNIQUES FOR TABLE GAMES

(71) Applicant: Generation Z, LLC, Columbus, MN (US)

(72) Inventors: Tom W. Bowling, Jr., Los Angeles, CA (US); Taro Ito, Columbus, MN (US)

(73) Assignee: Generation Z, LLC, Columbus, MN (US)

( * ) Notice: Subject to any disclaimer, the term of this patent is extended or adjusted under 35 U.S.C. 154(b) by 0 days.

(21) Appl. No.: 18/480,396

(22) Filed: Oct. 3, 2023

Related U.S. Application Data

(63) Continuation of application No. 17/902,108, filed on Sep. 2, 2022, now Pat. No. 11,810,433, which is a continuation of application No. 17/108,339, filed on Dec. 1, 2020, now Pat. No. 11,462,078, which is a continuation of application No. 16/155,850, filed on Oct. 9, 2018, now Pat. No. 10,861,291.

(60) Provisional application No. 62/569,352, filed on Oct. 6, 2017.

(51) Int. Cl.
*G07F 17/32* (2006.01)

(52) U.S. Cl.
CPC ...... *G07F 17/3293* (2013.01); *G07F 17/3211* (2013.01); *G07F 17/322* (2013.01); *G07F 17/3223* (2013.01)

(58) Field of Classification Search
CPC ............... G07F 17/3293; G07F 17/322; G07F 17/3211; G07F 17/3223
See application file for complete search history.

(56) References Cited

U.S. PATENT DOCUMENTS 5,200,890 A 4/1993 Pionchon
5,489,101 A * 2/1996 Moody .............. A63F 3/00157 D21/369

(Continued)

FOREIGN PATENT DOCUMENTS

WO WO 2008/091809 7/2008

OTHER PUBLICATIONS

'www.linkedin.com' [online]. "Multi-hand MultiDraw Poker," Jul. 10, 2017 [retrieved on Jul. 25, 2017]. Retrieved from the Internet: URL <www.linkedin.com/pulse/multi-hand-multidraw-poker-timothy-nottke>. 10 pages.

(Continued)

*Primary Examiner* — Steve Rowland
(74) *Attorney, Agent, or Firm* — Barnes & Thornburg LLP

(57) ABSTRACT

In one implementation, an electronic gaming system includes: a plurality of physical playing cards that are dealt by an automated or human dealer; a scanner that is configured to identify each physical playing card of the plurality of physical playing cards as they are dealt; a plurality of player computing devices that are configured to provide individualized gaming interfaces for a plurality of players; and a gaming computing device that is communicably connected to the scanner and the plurality of player computing devices. The gaming computing device may select different sets of dealt cards to provide different types of games to players at different ones of the gaming computing devices.

20 Claims, 14 Drawing Sheets

(56) References Cited

U.S. PATENT DOCUMENTS

| | | | | |
|---|---|---|---|---|
| 6,132,311 | A * | 10/2000 | Williams | G07F 17/32 463/13 |
| 6,508,709 | B1 | 1/2003 | Karmarkar | |
| 6,511,068 | B1 * | 1/2003 | Sklansky | A63F 3/00157 273/237 |
| 8,113,934 | B2 | 2/2012 | Moody | |
| 8,152,641 | B2 | 4/2012 | Hill | |
| 8,192,267 | B2 | 6/2012 | Acres | |
| 8,287,380 | B2 | 10/2012 | Nguyen et al. | |
| 8,414,403 | B2 | 4/2013 | Denham | |
| 8,425,298 | B2 | 4/2013 | Moody | |
| 8,708,809 | B2 | 4/2014 | Sanford | |
| 10,198,913 | B1 | 2/2019 | Deckoff et al. | |
| 10,861,291 | B1 | 12/2020 | Bowling, Jr. et al. | |
| 11,462,078 | B1 | 10/2022 | Bowling, Jr. et al. | |
| 2003/0162424 | A1 * | 8/2003 | Berman | A63F 3/00157 439/131 |
| 2003/0236113 | A1 * | 12/2003 | Webb | G07F 17/3293 463/11 |
| 2005/0020338 | A1 | 1/2005 | Stein | |
| 2007/0145684 | A1 * | 6/2007 | Webb | G07F 17/32 273/292 |
| 2008/0015030 | A1 | 1/2008 | Baazov | |
| 2008/0207294 | A1 * | 8/2008 | Sklansky | G07F 17/3293 463/13 |
| 2009/0111573 | A1 | 4/2009 | Iddings | |
| 2009/0111574 | A1 * | 4/2009 | Rowe | G07F 17/3281 463/20 |
| 2010/0117299 | A1 | 5/2010 | Nicely | |
| 2010/0222132 | A1 | 9/2010 | Sanford | |
| 2011/0079959 | A1 * | 4/2011 | Hartley | G07F 17/3223 463/22 |
| 2011/0195766 | A1 | 8/2011 | Toompere | |
| 2011/0300917 | A1 * | 12/2011 | Hill | G07F 17/32 463/11 |
| 2013/0084962 | A1 | 4/2013 | Radisich | |
| 2013/0196777 | A1 | 8/2013 | Hill | |
| 2015/0348371 | A1 * | 12/2015 | Blazevic | G07F 17/322 463/11 |
| 2016/0012663 | A1 | 1/2016 | Chun | |
| 2016/0071366 | A1 | 3/2016 | Lind et al. | |
| 2016/0098888 | A1 * | 4/2016 | Andres | G07F 17/326 463/22 |
| 2018/0089958 | A1 * | 3/2018 | Gordon | G07F 17/3258 |

OTHER PUBLICATIONS

Dionne et al., "Large volume flow rate acoustiophoretic phase separator for oil water emulsion splitting." Proceedings of Meetings on Acoustics, vol. 19 (Jun. 2, 2013), pp. 1-8. (Year: 2013).
Dutra et al., "Macro-scale acoustophoretic separation of lipid particles from red blood cells." Proceedings of Meetings on Acoustics, vol. 19(Jun. 2, 2013), pp. 1-7. (Year: 2013).
Lipkens et al., "Separation of bacterial spores from flowing water in macro-scale cavities by ultrasonic standing waves," arXiv upload (Jun. 2010), 1-11. (Year: 2010).

* cited by examiner

CARD-BASED ELECTRONIC GAMING SYSTEMS AND TECHNIQUES FOR TABLE GAMES

CLAIM OF PRIORITY

This application is a continuation of U.S. patent application Ser. No. 17/902,108, filed Sep. 2, 2022, which is a continuation of U.S. patent application Ser. No. 17/108,339, filed Dec. 1, 2020 and issued on Oct. 4, 2022 as U.S. Pat. No. 11,462,078, which is a continuation of U.S. patent application Ser. No. 16/155,850, filed Oct. 9, 2018 and issued on Dec. 8, 2020 as U.S. Pat. No. 10,861,291, which claims the benefit of priority to U.S. Provisional Patent Application No. 62/569,352, filed Oct. 6, 2017, the entire contents of each of which are herein incorporated by reference in their entirety.

TECHNICAL FIELD

This document generally describes technology related to electronic gaming systems that use manually dealt physical cards to provide electronic gaming.

BACKGROUND

Electronic gaming systems and devices have traditionally relied on random number generators to determine gaming outcomes that are displayed to players as part of the game. Additionally, electronic gaming systems receive player inputs based on the displayed gaming outcomes. For example, while a number of variations exist, electronic gaming devices typically deal a number of cards based on the type of game being played. Electronic gaming devices may allow the player to discard cards from the original hand and/or receive additional/replacement cards. An outcome of the game (e.g., whether the player won and the odds that apply to the win) may then be determined based on the final resulting hand. Each of the cards in the initial hand and the drawn cards (additional or replacement cards) can be determined by the electronic gaming devices using random number generators that are implemented by the electronic gaming devices.

SUMMARY

This document generally describes technology for electronic gaming systems that use physical cards (e.g., playing cards) that are randomized (e.g., shuffled) and dealt as a grid layout sequence. While card based table gaming using physical cards traditionally involves dealing each player at a table with his/her own cards to create a hand, card-based electronic gaming systems can be programmed to deal common cards as grid layout, which is then used in combination with player's actions to determine gaming outcomes. For example, instead of using computer-implemented random number generators to determine which outcomes (e.g., cards) a player receives as part of a game, electronic gaming systems can provide outcomes based on the cards that are dealt into a grid and the grid's configuration/layout. The cards may be dealt, for example, from a shoe and/or by a dealer, which are recorded by a scanner. For instance, a grid may be employed by an electronic gaming system to deal the initial base hands for each of the players at a table (physical and/or virtual). The initial hands are based on the order/layout of the cards in the grid and can be presented on displays for each player. Each player can individually select which of the five cards they want to discard. The card-based electronic gaming systems can then determine replacement cards for each player based on the order/layout of the cards in the grid.

The systems and techniques using the dealt grid of standard or non-standard playing cards described herein can be applied to any card based and non-card based table games such as Blackjack, Poker and its variants, Baccarat, Slots, Craps, Roulette, and so forth. For instance, a captured sequence may be employed in a card-based video roulette where spins of the roulette wheel are determined based on the cards in the dealt grid. As an example, each roulette slots may be mapped to group(s) of standard cards. As another example, the physical cards that are dealt and captured are non-standard cards that have a representation of the slots on a roulette wheel on each card. In such an example, each roulette slots may be mapped to the respective card.

In one implementation, an electronic gaming system includes one or more decks of physical playing cards, a scanner, multiple player computing devices, and a gaming computing device. The physical playing cards are dealt by an automated or human dealer. For example, electronic gaming system can optionally include a shoe to facilitate automated dealing. The scanner scans each physical playing card as they are dealt and identifies each of the cards. The gaming computing device can be communicably connected to the scanner and the multiple player computing devices. The gaming computing device can be configured to (i) select a first set (e.g., a proper subset) of the dealt physical playing cards to provide a first type of game to players at a first set of the player computing devices and (ii) select a second set (e.g., a proper subset) of the dealt physical playing cards to provide a second type of game to players at a second set of the player computing devices.

Certain implementations can include one or more of the following optional features. The physical playing cards can be dealt into respective card positions of a pre-defined dealing grid. The first set of the physical playing cards can be selected from a first pre-defined area of the dealing grid, the first pre-defined area consisting of a first subset of the card positions of the dealing grid. The second set of the physical playing cards can be selected from a second pre-defined area of the dealing grid, the second pre-defined area consisting of a second subset of the card positions of the dealing grid. The second subset of the card positions can be different than the first subset of the card positions in the dealing grid.

In one implementation, an electronic gaming system to provide electronic video poker gaming using physical playing cards includes a plurality of physical playing cards that are physical dealt by a dealer; a scanner that is configured to identify each physical playing card of the plurality of physical playing cards as they are dealt; a plurality of player computing devices that are configured to provide individualized gaming interfaces for a plurality of players, the plurality of player computing devices each configured to: output, in a graphical user interface, a graphical prompt for each player to select one of a plurality of grouped placeholders for draw cards to be dealt in a next poker hand, the graphical prompt including a plurality of selectable features that correspond to the plurality of grouped placeholders for draw cards, receive, via the graphical user interface, selection of one of the plurality of selectable features that corresponds to particular grouped placeholder for draw cards from among the plurality of grouped placeholders for draw cards, wherein the graphical prompt is output and the selection is received before cards for the next poker hand are dealt, output, in the graphical user interface after receiving the selection, an initial poker hand corresponding to a first group of the physical cards that are dealt by the dealer and identified by the scanner, wherein the initial poker hand is common across the plurality of player computing devices, receiving, via the graphical user interface, user input designating one or more cards in the initial poker hand to be discarded, wherein the user input is received before a plurality of second groups of physical cards are physically dealt into the plurality grouped placeholder for draw cards, and output, in the graphical user interface after the plurality of groups of draw cards are physically dealt, one or more draw cards in place of the one or more cards to be discarded to generate a final poker hand, the one or more draw cards being selected from a particular second group of physical cards that are dealt by the dealer and placed in the particular grouped placeholder for draw cards; and a gaming computing device that is communicably connected to the scanner and the plurality of player computing devices, the gaming computing device configured to: receive, from the plurality of player computing devices, selections from among the plurality of grouped placeholder for draw cards and designations of discards for the plurality of player computing devices, receive, from the scanner, the first group of physical cards and the plurality of second groups of physical cards, determine final poker hands and poker gaming outcomes for each of the plurality of player computing devices based on the selections of the plurality of grouped placeholders, the designations of discards, the first group of physical playing cards, and the second groups of physical playing cards, and transmitting the final poker hands and poker gaming outcomes to the plurality of player computing devices.

Such implementations can optionally include one or more of the following features. The plurality of grouped placeholders for draw cards can include a plurality of rows onto which the plurality of second groups of physical cards are dealt The electronic gaming system can further include a gaming surface onto which the first group of physical cards and the plurality of second groups of physical cards are dealt. The plurality of rows can include predesignated rows identified on the gaming surface with one or more markings. Each of the plurality of rows comprises five placeholders onto which five physical draw cards are dealt. The plurality of rows can include three rows. The plurality of rows can include more than three rows. The plurality of selectable features can include a plurality of selectable graphical elements that are displayed on the graphical user interface. The first group of cards can include five cards and each of the plurality of second groups of cards comprises five cards. The one or more draw cards can be selected from one or more locations in the particular second group of physical that correspond to one or more locations in the first group of physical cards for the one or more cards to be discarded. The plurality of player computing devices can be further configured to: provide one or more additional games in the graphical user interface using (i) at least a portion of the first group of physical cards and (ii) at least a portion of the plurality of second groups of physical cards. The poker gaming outcomes and outcomes for the one or more additional games can be determined using common cards from the first group of physical cards and the plurality of second groups of physical cards. The first group of physical cards can be one of a plurality of first groups of physical playing cards that are dealt first, before player action and before the plurality of second groups of physical cards are dealt. The one or more additional games can use a different portion of the plurality of first groups of physical playing cards and a different portion of the second groups of physical playing cards than are used to determine the poker gaming outcomes. The one or more additional games can include blackjack. The one or more additional games can include baccarat. The one or more additional games can include slots. Tach of the plurality of player computing devices can be configured to play multiple different games simultaneously.

Certain implementations may provide one or more advantages. For example, table-based gaming can be provided to a large number of players from a single table. Traditional table games have a limited number of seats available for players. For example, poker-based table games may limit the number of players anywhere from five to eight players. In contrast, electronic gaming systems employing a grid of common cards can allow participation of players at the physical table where the cards are being dealt as well as players who are remote from the table and connected to the table virtually. This can expand the number of players (beyond just those seated at the physical table) for a single table to include a large number of players who may be playing remotely from a location within a gaming facility (e.g., casino, card club, race track) and/or over the internet. Additionally, the number of players can be expanded without concern for the ratio of players to remaining cards in the deck/shoe. For example, conventional table game may use a large number of cards per player-requiring a dealer's shoe/deck to have a certain number of cards available for each player per hand, which can limit the number of players who are able to play each hand. Through the use of a grid of common card to determine gaming outcomes, a nearly limitless number of players can play each hand. This reduction in the resources, both physical (in terms of cards and dealer time to deal out each hand) and electronic (in terms of computing resources used to process game play, such as processor cycles, memory, network traffic, etc.), can make game play more efficient and faster. Additionally, even though electronic gaming systems employing a grid of common cards, it still permits each player to individually make moves (e.g., designate cards to be discarded) regardless of whether they are seated at the physical table or remote, which can improve player engagement while maintaining gaming efficiencies.

In another example, electronic gaming systems employing a grid of common cards can be provided in jurisdictions (e.g., cities, counties, states, countries) that prohibit gaming outcomes based on random number generators and pseudo-random number generators. Conventional electronic gaming has relied on computer-based random number generators and pseudo-random number generators to electronically determine which cards are dealt to players. Some jurisdictions prohibit the use of random and pseudo-random number generators to determine gaming action and outcomes-meaning that in those jurisdictions, conventional electronic gaming is prohibited in gaming facilities. By providing electronic gaming with common cards with dealer-assist electronic gaming systems, electronic gaming can be provided to players in these jurisdictions that prohibit random and pseudo-random number generators because the gaming action and outcomes are determined by physical cards that are physically dealt by a dealer into the grid of cards (i.e., outcomes are determined by the random sequence of physical cards in a deck/shoe as a result of a physical shuffle, not by a random or pseudo-random number generator).

In another example, the speed of game play can be increased. For example, instead of waiting for each player to make moves and to receive additional cards, one or more common periods of time can be allocated for players to make moves and then a single set of replacement cards can be drawn by the dealer (instead of individual cards for each player). Accordingly, the amount of time that it takes for each hand to play out can be decreased and the game play can be improved. Thus, the amount of time taken away from game play can be reduced, the electronic and physical resources that are allocated per player can be reduced, and the amount of time dedicated to game play can be increased.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
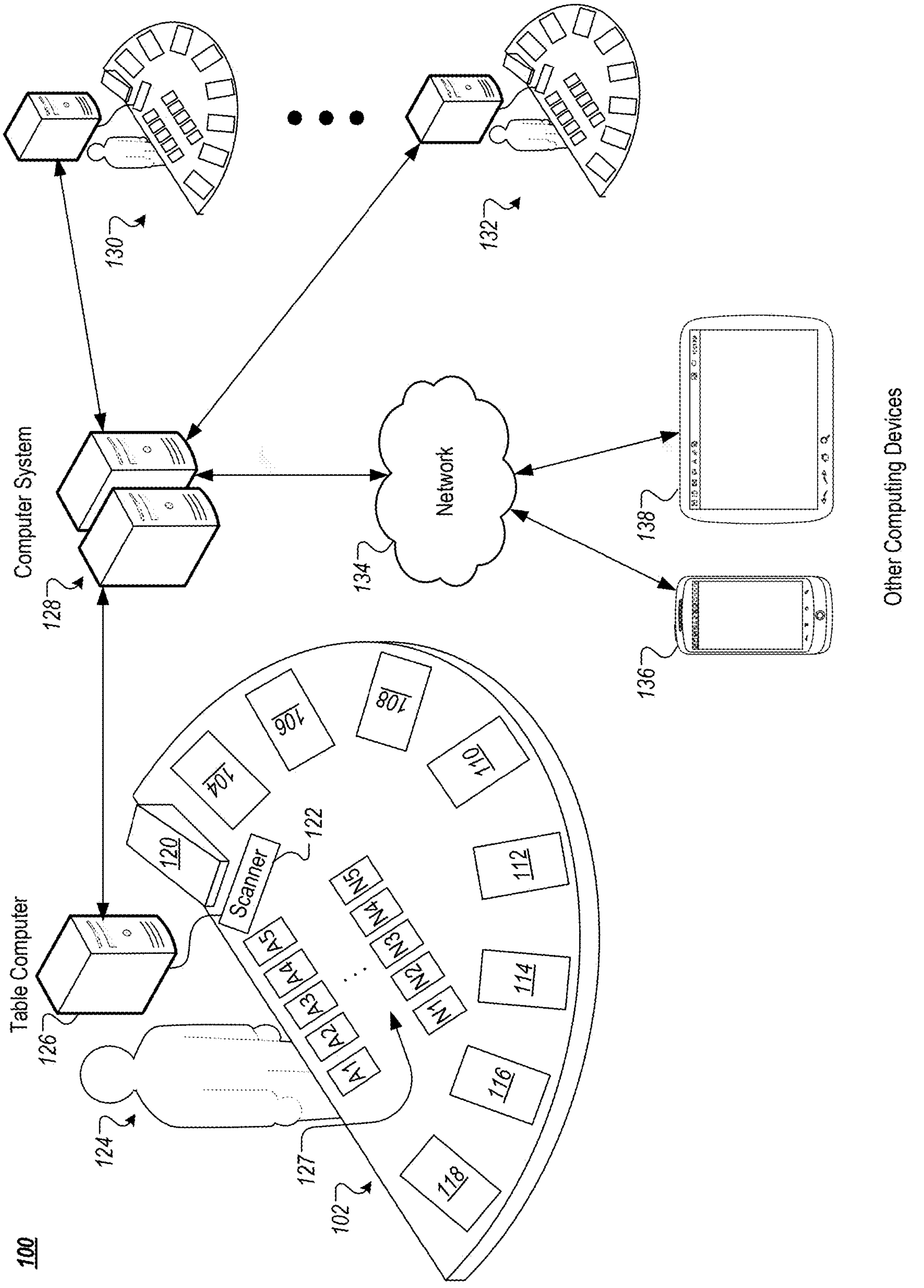
FIGS. 1A-B are conceptual diagrams of an example card-based electronic gaming system.
Figure 1B:
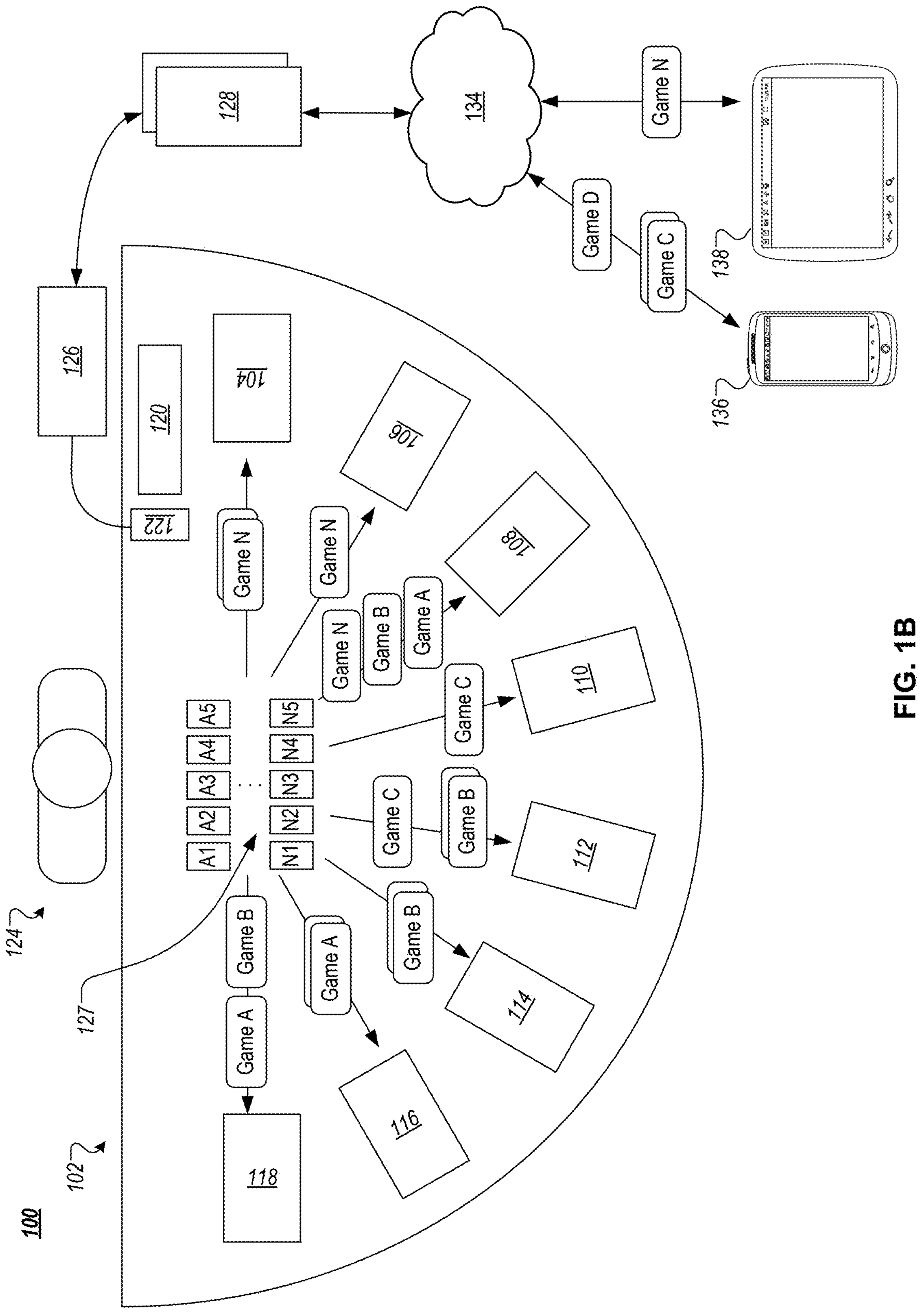

FIGS. 1A-B are conceptual diagrams of an example card-based electronic gaming system 100. The system 100 includes an example gaming table 102 that includes computing devices/displays 104-118 (i.e., 104, 106, 108, 110, 112, 114, 116, and 118) that are located at each of the positions for the table 102. The table 102 also includes a scanner 122 that is configured to automatically detect cards that are dealt out of the shoe 120. The scanner 122 can be implemented in any of a variety of ways, such as an optical scanner that is configured to detect each card that is dealt from the shoe 120 through optical recognition of one or more unique portions of the cards (e.g., image recognition techniques to identify the suit and number for each card and/or to identify a code printed on each card, such as a barcode or Quick Response (QR) code), radio frequency-based identification (RFID) (e.g., recognition of RFID tags included in each card), and/or other identification techniques. In some implementations, the cards that are dealt out of the shoe 120 are specialized playing cards with one or more features (e.g., codes, RFID tags) that are specifically designed for detection by the scanner 122. In other implementations, the cards that are dealt out of the shoe 120 are standard playing cards without specially designed features. The cards are dealt into a grid 127 (See FIGS. 2-3 below). Once dealt, the grid of cards 127 can be employed by the system 100 to determine various gaming outcomes based on the position of cards within the grid 127.

Card-based electronic gaming is provided at the table 102 through the use of a computing device 126 that, in combination with the scanner 122, detects the cards that are dealt from the shoe 120 by a dealer 124 (which can be a human, robot, or other mechanical dealing device/machine), determines the position of each dealt card in the grid 127, manages gaming information and interactions through the devices/displays 104-118, and determines gaming outcomes based on the grid of cards 127 and the player actions (as designated through the devices/displays 104-118). In some implementations, the table computing device 126 may use prerecorded sequences of cards that are dealt into grid 127, which may be a virtual grid of cards. The shoe 120 can store one or more decks of physical playing cards that are randomly ordered within the shoe 120 through physical shuffling of the cards (e.g., machine shuffling, manual shuffling, or a combination thereof).

The size and shape (i.e., the number of columns and rows) for grid 127 may vary based on the type of game(s) being offered by system 100 and/or the number of players that can be supported by system 100. The dealer 124 may place each card as dealt from the shoe 120 into the grid 127 based on a particular pattern. For example, as shown in FIGS. 1A-B the first card may be placed in position A1, the second card may be placed in position A2, and so forth until the grid is filled. As an alternative example, the first card may be placed in position N5, the second card may be placed in position N4, and so forth until the grid is filled. Any number of patterns may be employed to fill the grid. The pattern can be switched by the dealer after each grid is used to determine gaming outcomes or after a particular number of grids have dealt and used. The patterns used for card placement into the grid 127 may be rotated through based on a particular ordering of the patterns. Grid 127 may also be built virtually by table computing device 126 as the cards are dealt by the dealer and read by the scanner 122 or based on a prerecorded dealt sequence of cards.

Through these collective parts (table 102, computing device 126, scanner 122, shoe 120, dealer 124, devices 104-118) the system 100 can provide dealer assist electronic gaming to players through the use of physical cards as dealt into grid 127, where the gaming outcomes are determined by the random ordering of physical playing cards within the shoe 120 instead of through a random or pseudo-random number generator.

The table computing device 126 determines initial and next gaming outcomes for each player computer device 104-118 and remote computer devices 136-138 based on the cards in grid 127 for both card based and non-card based games. Examples of card based table games include, but are not limited to, Baccarat, Blackjack, Casino war, Faro, Poker and its variants, Red Dog, Teen Patti, and Trente et Quarante. Examples of non-card based table games include, but are not limited to, Chuck-a-luck, Craps, Pai Gow, Sic bo, Big Six wheel, Roulette, Fan-Tan, and Two-up. The table computing device 126 may employ multiple grids to manage multiple games at the same time or to use one grid from which to select initial hands and another grid from which to select additional or replacement cards.

The table computing device 126 is programmed to use common cards to provide electronic gaming to the players through the devices 104-118. For example, the table computing device 126 can detect an initial hand of cards based on the cards dealt by the dealer 124 and their placement in grid 127. The table computing device 126 can transmit information identifying the cards initial cards to the player devices 104-118. Each of the player devices 104-118, which can be any of a variety of computing device with an associated display (e.g., tablet computing device, embedded computing device), can present the initial hand to the players along with selectable options to discard some, none, or all of the initial cards. For example, the devices 104-118 can include touchscreens that present selectable buttons to discard or keep each of the initial cards. In another example, the devices 104-118 can include physical buttons corresponding to each of the initial cards through which the player can designate which cards to keep or discard. Additionally, multiple games/hands may be displayed by the devices 104-118 to a respective player. Player actions can be maintained locally on the devices 104-118 and/or can be transmitted to the table computing device 126. Additional information is provided below regarding the various displays for devices 104-118 in FIGS. 7-8.

Once all player actions have been received and/or after expiration of a time period for players to enter their actions (e.g., 5 seconds, 10 seconds, 15 seconds, 20 seconds, 30 seconds), additional or replacement cards are selected from the cards in grid 127 by the table computing device 126 (via the scanner 122) and applied across the players' hands based on their individual actions through the devices 104-118. The cards in grid 127 can be applied to each player's hand based on a grouping for the particular game being played.

The dealer 124 may also deal a second grid 127 of cards from which the additional or replacement cards can be selected (See the description of FIG. 3 below) by the table computing device 126. The second grid 127 may be dealt according to the same pattern and the first grid or a different pattern may be used. For example, A1 can be applied for the first card discarded from an initial hand, A2 can be applied for the second card discarded, A3 for the third, A4 for the fourth, and A5 for the fifth. So, if the player using device 104 decided to discard one card from the initial poker hand, then the discarded card is replaced with A1. Similarly, if the player using device 106 decided to discard two cards from the initial poker hand, then the discarded cards are replaced with A1 and A2, and so on. Alternatively, if the player using device 106 decided to discard two cards from the initial poker hand, then the discarded cards are replaced with A2 and A3 (because A1 was provided to the first player), and so on. Example hands using the system 100 with common cards are described below with regard to FIGS. 2 & 3.

Figure 3:
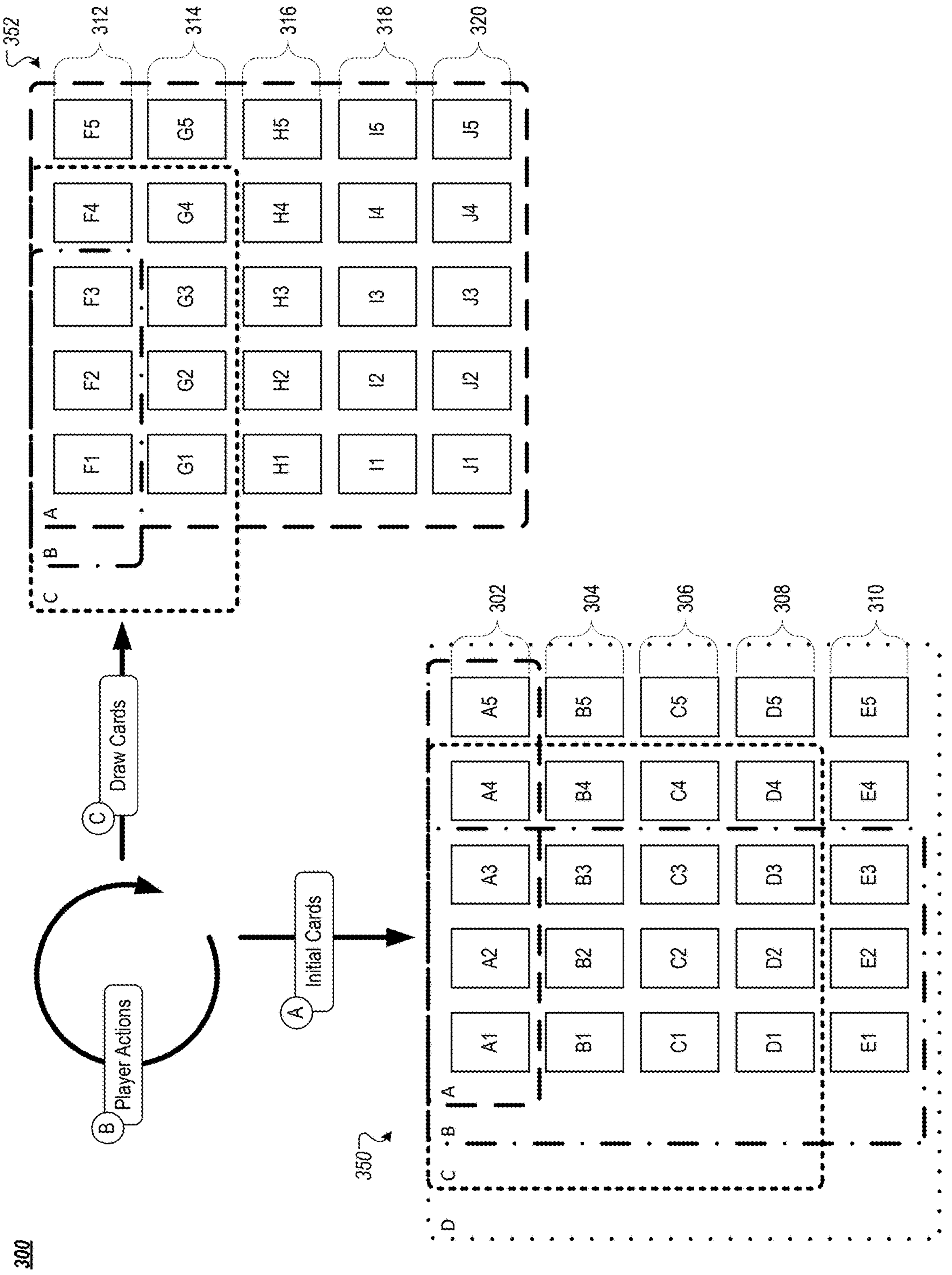
FIG. 3 depicts two example grids of common playing cards.

The table computing device 126 and/or the player devices 104-118 can determine the outcome of the game for each player based on the initial hand provided from grid 127, the player's actions (e.g., cards designated for discard), and the draw cards taken from grid 127 or from a second dealt grid (see FIG. 3). In some implementations, the table computing device 126 (in combination with a central computer system 128) can determine and manage gaming at each of the positions, and can simply use the devices 104-118 to present information to the players and to obtain player inputs (e.g., discard selections, bet amounts). In the depicted example (FIG. 1B), table computing device 126 manages Games A-N for each of the devices 104-118 as well as remoted devices 136-138. In other implementations, each of the devices 104-118 can manage an individual player's gaming and can communicate with the table computing device 126 to receive card information. Other implementations are also possible.

The system 100 can additionally incorporate and permit remote players to play various games on the table 102, such as through other computing devices 136 and 138 (e.g., smartphones, tablet computing devices, wearable devices, desktop computers, laptop computers, media computing devices, video gaming systems, virtual reality systems, augmented reality systems). For example, the system 100 can use the central computer system 128 to connect remote players with the table computing device 126 so that remote players can additionally participate in an electronic game on the table 102. Such remote players may be located in the same facility as the table 102 (e.g., casino, card club, horse track) and/or remote from such a facility (e.g., located remotely, at home). Via the devices 136 and 138, the remote players can connect to the computer system 128 and the table computing device 126 to participate in an electronic game at the table 102 and/or other tables 130-132 over one or more networks 134, such as the internet, local area networks (LAN), wide area networks (WAN), virtual private networks (VPN), mobile data networks (e.g., 4G LTE networks), wireless networks (e.g., Wi-Fi networks, BLUETOOTH networks), and/or combinations thereof. The remote device 136 and 138 can download and run code from the computer system 128 to provide electronic gaming on the devices 136 and 138 (e.g., provide user interfaces to establish/login to user accounts, to designate bet amounts, to present the initial hand, to receive keep/discard action, to present the final hand based on the received draw cards, to determine gaming outcomes based on the final hand, and to allocate winnings to the player account). Such code can be, for example, a mobile application ("mobile app") that is downloaded and installed on the computing devices 136 and 138, a browser-based application that is downloaded and run within a web browser application on the computing devices 136 and 138, a standalone application that is downloaded and installed on the computing devices 136 and 138, and/or other types of code and/or applications.

The computer system 128 can additionally allow players, such as local players using devices 104-118 and/or remote players using devices 136-138, to bounce between gaming at tables 102 and 130-132, and to even combine common cards from multiple different tables 102 and 130-132 for an electronic gaming hand. For example, a player can press a button requesting that the computer system 128 place him/her in the table that is going to be dealing next, so as to allow the player to minimize wait time. The computer system 128 can automatically transfer such a player to a table that is the first to scan a card in an initial gaming hand, and can present the initial gaming hand from that table to the player, even though the player may be located at another table or remote from the table. In another example, a player who locks in his/her discard selections early (at least a threshold amount of time before a selection time period will expire) may be given a draw from another table (e.g., table 130) that occurs sooner than the draw from the table (e.g., table 102) that dealt the initial hand. Additionally, the computer system 128 may perform load balancing of players so as to more evenly distribute players across the tables 102 and 130-132.

The computer system 128 can additionally distribute video, audio, and/or chat feeds for the tables 102 and 130-132 to remote players using the computing devices 136-138.

Figure 2:
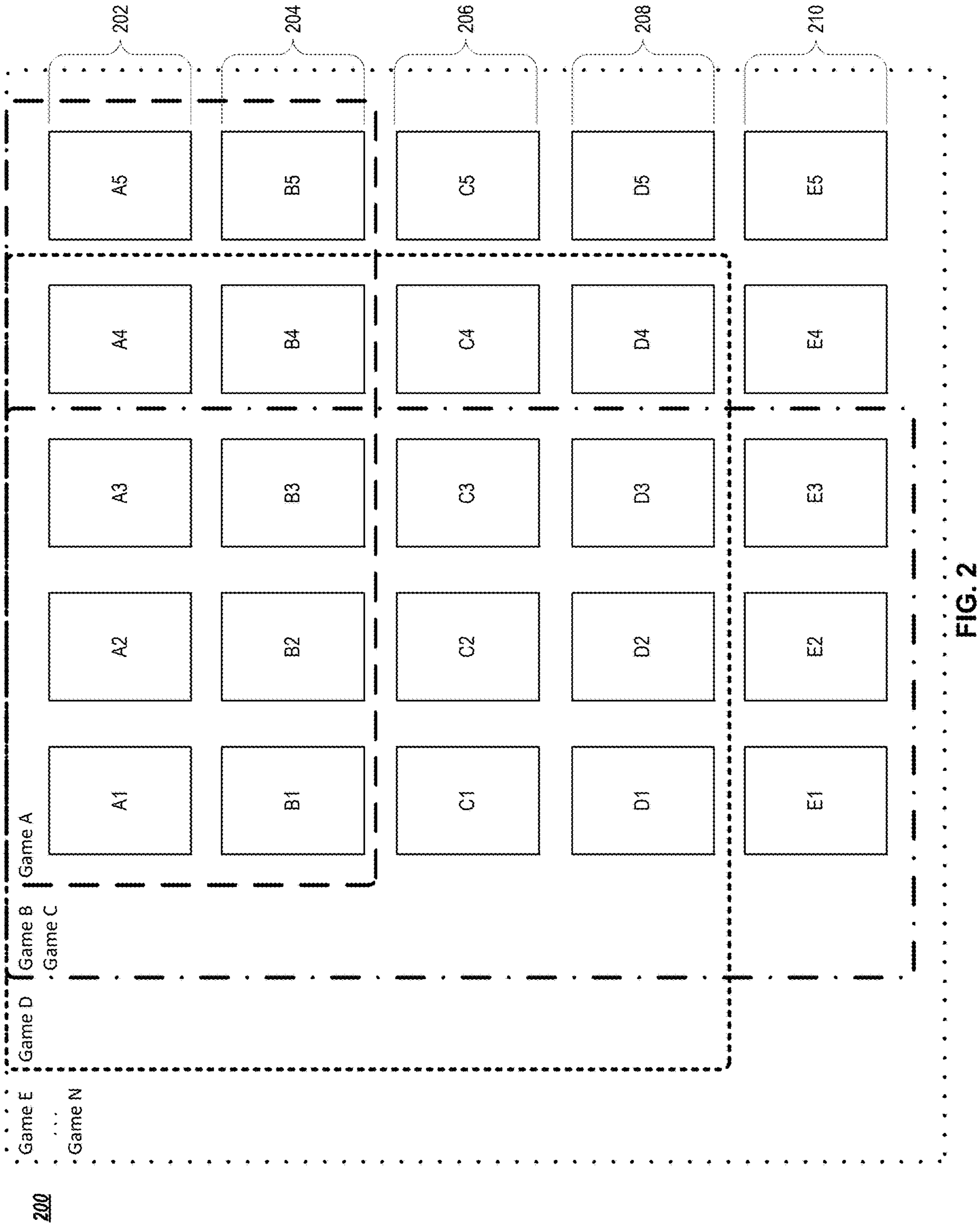
FIG. 2 depicts an example grid of common playing cards.

FIG. 2 depicts an example grid of common playing cards 200, which is substantial similar to grid 127 of FIG. 1. Depicted in FIG. 2 are various example predefined areas, Games A-N, of the grid 200. Physical cards are dealt by a dealer (e.g., dealer 124) into grid 200, which is then used by an electronic table computing device, such as table computing device 126. In some implementations, grid 200 is constructed based on a sequence of previously dealt and recorded cards. Each of the predefined areas of grid 200 may be used by the table computing device for a particular type of game, Game A, Game B, and so forth, for which the table computing device provides gaming outcomes. As depicted, grid 200 includes cards A1-5, B1-5, C1-5, D1-5, and E1-5. Grid 200 is depicted as including five rows, rows 202-210, and five columns; however, any combination of rows and columns may be employed by the system to determine gaming outcomes.

In the depicted example, the table computing device uses cards A1-5 and B1-5, for "Game A." The table computing device selects cards for game play based on card position in the grid. A player may be assigned a starting position in the grid or section of the grid assigned to the particular game from which the table computing device may select cards. The table computing device may select cards sequentially or based on a step sequence (e.g., every other card) from the grid starting from the starting position or based on a draw order assigned to the player or player's hand. For example, A1 may be the starting position and a step sequence of every other card being selected (i.e., A3 would be the second card selected, A5 would be the third cards selected, B2 would be the fourth card selected, and so forth). Other possible algorithms may be used to determine the initial hand and draw cards from the grid. In some implementation, a player's draw position may be determined according to the steps in FIGS. 6A-E (see description of FIG. 5C below).

Once cards for each initial hand are determined, for example cards A1-5, the hands may be presented as an initial virtual hands to players on computing devices, such as the devices 104-118 and/or remote devices 136-138 (e.g., in a five-card poker game). The devices may record a respective player's action, such as a discard selection(s). The table computing device may then use cards B1-5 to replace discarded cards for each player (i.e., the table computing device provides a replacement card based on the position of the discarded card in the respective player's hand). For example, the table computing device may replace A2 from a player's hand when discarded during a player's action with card B2. Alternatively, the table computing device may provide a replacement card based on the sequential order of the row. For example, B1 would replace the first card discarded during a player action regardless of the position of the discarded card and so forth. In another alternative implementation, the table computing device uses a draw order of for the draw cards that is assigned to each player. In a similar manner, the table computing device may use each predefined section of grid 200 (e.g., Games A-N) and a draw order, which may be updated between games and/or a series of games as described above, for each predefined section to provide gaming outcomes to the player computing devices for each type of game supported by the table computing device.

As an example, assuming that Game A is five-card draw poker, an outcome for each player is determined based on the final five cards in each player's hand, which, as indicated above, may be based on the Game A section of grid 200, a draw order, and each player's action. In this example, a player with a pair may receive a 1:1 payout, a player with two pairs may receive a 3:2 payout, and a player with a royal flush may receive a 100:1 payout. Odds and outcomes can vary and can be determined using payout tables that correlate a hierarchy of poker hands to different payout odds. For example, the devices 104-118 and 136-138 can permit players to select a type of five-card draw poker game (e.g., Jacks or Better, Tens or Better, Deuces Wild, Bonus Poker, Double Bonus Poker) that they are playing, which can each have different payout tables that provide different odds for different types of hands. In addition to having different gaming outcomes based on the cards that players decide to discard from their initial hand, a variety of other factors can additionally determine the outcome for the player and the payout odds, such as the type of game that a player selects to play, the bet amount relative to the minimum bet denomination (e.g., max bet amount for a game can have greater odds than the minimum bet amount), the location at which the game is being played (e.g., game in bar can use payout table with different odds than standalone gaming device/table on floor of casino), the type of device on which the game is being played (e.g., standalone gaming device/table can have greater odds than gaming provided on mobile device), whether the game is part of a progressive jackpot pool (e.g., gaming devices part of a progressive pool that builds overtime until a player gets a particular type of hand(s) can have different odds than gaming devices that are not part of a progressive pool), and/or other factors.

For instance, under a Deuces Wild game, the player may not win the hand unless he/she attains a hand of three of a kind or better (with deuces being wildcards), whereas with the Jacks or Better game, the player may win the hand when he/she attains a pair of jacks or better—the payout table for these games correlates different hands within the hierarchy of poker hands to different outcomes and odds. The gaming outcome for players, and in particular the payout ratio, can depend on a bet amount and/or the location at which the game is being played (e.g., local at the table can have the highest payout, remote location within the gaming facility can have next highest payout, and remote connection outside the gaming facility can have lowest payout—other schemes are also possible). For example, many electronic games can permit a player to bet in increments of a minimum bet amount (e.g., $0.05/hand) up to a maximum bet (e.g., 5× maximum bet for maximum of $0.25/hand). However, the payout for some maximum bets (e.g., 5× bet) can be greater than the multiplier for the maximum bet. For instance, a royal flush may payout at 300:1 for a 1× bet of the minimum bet amount, whereas a royal flush may payout at 3000:1 for a 5× bet of the minimum bet amount, which is a 10× multiplier of the payout for a 5× multiplier of the bet amount.

The devices 104-118 and 136-138, the computer 126, and/or the computer system 128 can be programmed to provide electronic gaming outcomes to the players based on the cards in grid 200; the predefined section of the grid mapped to the current game (e.g., Games A-N), a selection algorithm which determines the initial poker hands and draw cards based on, for example, a draw order; the player discard actions; the poker game selected by each player; and the bet amounts placed by each player. For instance, referring to the example grid 200 depicted in FIG. 2, the selection algorithm for a poker game may designate one of the rows of cards (e.g., row 202 with cards A1-A5) as the initial hand that provided to each player, and from which players can individually select discards. Once players have entered their discard actions, the remaining rows of cards can be dealt (e.g., deal rows 202-210). The selection algorithm can use any of a variety of techniques to allocate draw cards from the remaining rows for each of the players, which providing for variation in which draw cards are allocated to each of the players. For example, the selection algorithm can assign different draw orders across some or all of the cards in the remaining rows to the players, such as assigning different orderings of cards within the same row (e.g., each player assigned different order of cards B1-B5 for row 204), assigning different rows of cards to each player (e.g., each player assigned one of rows 204-210), assigning different orderings of cards across different rows (e.g., each player assigned different order of cards B1-E5 for rows 204-210), and/or combinations thereof. The assignments can be automatically determined by the system (e.g., techniques described below for FIGS. 6A-B, 6D-E) and/or based on user input/selection (e.g., technique described below for FIG. 6C). For instance, if the row 202 (cards A1-A5) is used to provide the initial hand, each player may be given the option to select one of the rows 204-210 (example of four remaining rows is depicted, but other numbers of rows from which players can select may be provided-such as two rows, three rows, five rows, etc.) to provide the draw order for the player. The selected row 204-210 for each player may then be used to replace discards for each player using any of a variety of appropriate techniques, such as starting with a first card in the selected row and proceeding sequentially through the row (e.g., replace first discard with B1, next discard with B2, and so on), replacing each discard with a corresponding positioned card within the selected discard row (e.g., replace discard A2 with corresponding card B2 in selected row 204, replace discard A5 with corresponding card A5 in selected row 204), and/or combinations thereof. Other techniques and processes for selecting cards to replace discards are also possible.

The devices 104-118 and 136-138 can be part of a pool of gaming devices that provide progressive jackpots, which are jackpots that build over time until a player gets a particular hand (e.g., royal flush, straight flush). For example, the devices 104-118 can be part of the same progressive pool that builds over time until a player at one of those devices 104-118 gets a particular hand that wins the progressive jackpot, such as obtaining a royal flush. There can be multiple different progressive pools across different groups of gaming devices.

FIG. 3 depicts two example grids of common playing cards 350 and 352, which are substantial similar to grid 127 of FIG. 1 and grid 200 of FIG. 2. Similar to grid 200, grids 350 and 352 include various example predefined areas for Games A-N. As described above, physical cards are dealt by a dealer (e.g., dealer 124) into grid 350 and 352, each of which is then employed by an electronic table computing device, such as table computing device 126. In some implementations, grids 350 and 352 are each constructed based on a sequence of previously dealt and recorded cards. Each of the predefined areas of grids 350 and 352 may be used by the table computing device for a particular type of game, Game A, Game B, and so forth, for which the table computing device provides gaming outcomes. As depicted, grid 350 includes cards A1-5, B1-5, C1-5, D1-5, and E1-5 and grid 352 includes cards F1-5, G1-5, H1-5, I1-5, and J1-5. Grids 350 and 352 are depicted as including five rows (rows 302-310 and 312-320 respectively), and five columns; however, any combination of rows and columns may be employed by the system to determine gaming outcomes.

In the depicted example, the table computing device uses cards A1-5 from grid 350 for the initial hand and cards F1-F5 from grid 352 as draw cards for "Game A." The table computing device may select cards for game play based on card position in the grids and draw order assigned to each player. A player may be assigned a draw order common to all grids employed by the table computing device or a different draw order for each grid and/or game section within the grid. As an example, a player's draw order for grid 350 for the defined Game A section (cards A1-5) may select positon 2 first, position 4 second, position 5 third, position 3 fourth, and position 1 fifth while the draw order for grid 352 for the defined Game A section (cards F1-5) may select position 1 first, position 2 second, position 3 third, position 4 fourth, and position 5 fifth.

As depicted, for step A, Initial Cards, cards A1-5 from grid 350 may all be selected by the gaming computing device and presented as initial virtual hands to example players on computing devices, such as the devices 104-118 and/or remote devices 136-138. For step B, Player Actions, the devices may record a respective player's action, such as a discard selection(s). For step C, Draw Cards, the table computing device may then use cards F1-5 from grid 352 to replace discarded cards for each player. For example, a player's draw order may replace the card at position A2 from the player's hand when discarded during a player's action with the card at position F2. In such instances, different players can be assigned to different rows 312-320 of cards from the draw card grid 352 from which the corresponding draw card position is selected. For example, a first player may be assigned to row 312, a second player may be assigned to row 314, and a third player may be assigned to row 316. If each of these players select the same card A2 to discard from the initial hand, the draw card that is used to replace this discard can be different-card F2 for the first player, card G2 for the second player, and card H2 for the third player- and the resulting hands for the players can be different, even though they started with the same initial hand and performed the same discard action. Players can be assigned one of the rows 312-320 using any of a variety of techniques, such as based on user input/selection of one of the rows 312-320 (e.g., see technique described with regard to FIG. 6C) and/or automated selection (e.g., see techniques described with regard to FIGS. 6A-B and 6D-E). Any number of rows can be presented in the grid 352 from which the players can manually select and/or be automatically assigned a row, such as two rows, three rows, four rows, etc. Alternatively, a replacement card based on the sequential order of the row and/or a starting position assigned to the player. For example, F1 would replace the first card discarded during a player action regardless of the position of the discarded card and so forth. In a similar manner, the table computing device may use each predefined section of grid 350 and 352 (e.g., Games A-N), which may be updated between games and/or a series of games as described above, for each predefined section to provide gaming outcomes to the player computing devices for each type of game supported by the table computing device.

Figure 4:
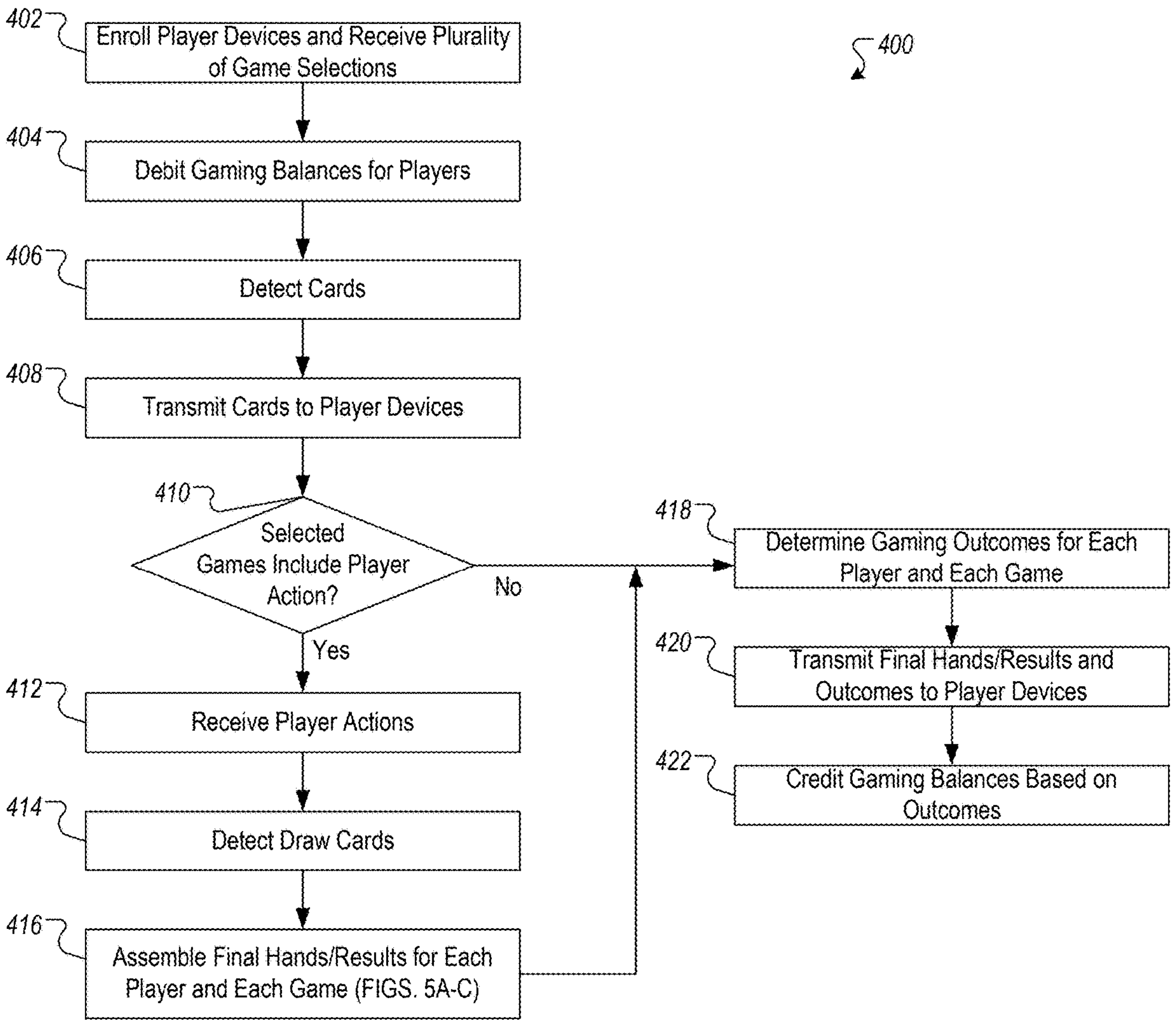
FIG. 4 is a flowchart of an example technique for performing card-based electronic gaming.

FIG. 4 is a flowchart of an example technique 400 for performing card-based electronic gaming. The example technique 400 can be performed by any of a variety of appropriate computing devices and/or systems, such as the table computer system 126, the computing devices 104-118 and 136-138, and the computer system 128.

Player devices that are going to play an electronic game can be enrolled and their game selections received (402). Debits for playing the game can be taken against gaming balances for each of the players (404). For example, the computing devices 104-118 and 136-138 can enroll with the computing device 126 and/or the computer system 128 to play in a next hand of a selected game(s) on the table 102, and a debit/ante to play the game can be taken from each player's virtual gaming balance that is maintained on computing devices 104-118 and 136-138, the computing device 126, and/or the computer system 128.

Enrolling a new player can include, for example, the player either creating or providing player account information via the computing devices 104-118 and 136-138. For example, a new player may create a new player account by physically and/or electronically depositing money via the computing devices 104-118 and 136-138, the computing device 126, and/or the computer system 128 (e.g., feeding physical money into a bill reader device that is part of/connected to the computing devices 104-118, providing credit/debit card information, providing bank account information). A unique account identifier can be created and funds deposited into the account can be credited to the account by the computing device 126 and/or the computer system 128, for example, as part of a ticket-in ticket-out (TITO) system. Players with preexisting accounts can provide account information via the computing devices 104-118 and 136-138 through one or more input mechanisms, such as through a physical ticket reader (e.g., ticket reader to read unique account identifier encoded on the ticket), through a player card reader (e.g., magnetic strip reader, RFID reader), through input of a username and password, and/or through other input mechanisms. New players can be prompted through one or more selectable options to designate a type of electronic game they want to play and/or to designate a bet amount for the next hand.

Enrolling existing players in a next gaming hand can include, for example, players either providing or not providing particular types of input within a threshold amount of time for the next hand to start. For example, in some instances players may have to opt-in to play a next hand, and can be provided with a time-limited selectable option to opt-in to game play for a next gaming hand at a table where the player just finished a hand. Failure to select the option within a threshold amount of time can cause the player to sit-out the next hand, although the player may be enrolled to play a next hand at another table. In other instances, player may have to opt-out to avoid repeating his/her bet in a next hand, and can be provided with a time-limited selectable option to opt-out of game play for the next hand at a table. Failure to select the option within the threshold amount of time can cause the player to be automatically enrolled in the next hand at the same bet amount. Other opt-in and opt-out options are also possible, such as a player designating a bet amount for a next gaming hand as an implicit opt-in for a next hand. Existing players can additionally be provided with selectable options between hands to change the type of game that they are playing between and/or to change their bet amount.

Physical cards that are going to be used by the table computing device to determine initial hands for players through their respective devices can be determined (406) from a grid, such as grid 127, 200, 350, and 352. The cards may be included in a defined section of the grid, such a Games A-N of FIGS. 2 and 3, for the particular game being managed by the table computing device. For example, the table computing device 126 can determine an initial hand of cards based on the card order or placement in the grid. In some implementations, a section of the grid, such as shown in FIGS. 2 and 3 may be used to build the initial hand. Information identifying the cards for the initial hand can be transmitted to the player devices that are enrolled in the game (408). For example, the table computing device 126 can transmit information identifying the cards in each initial hand to the devices 104-118 and 136-138, which can present the cards on the displays to the players along with selectable options through which the players can, for example, designate which cards they will hold and which cards they will discard. As discussed above, each player may be presented with the same initial hand, but can make individual game decisions so far as which cards are held and which cards are discarded. For example, players can employ different game play strategies, which may be dictated in part based on the type of game that each player has elected to play (e.g., some games payout for a pair of cards whereas others only begin paying out with three of a kind) as well as the bet amount that each player has placed for the hand (e.g., some outcomes can pay at increased multipliers for higher bet amounts). In some implementations, the table computing device 126 may use the cards in the grid 127 and present each player with a unique initial hand through the players respective gaming device 104-118 and 136-138.

When the selected game includes player action(s) (410), the players can provide their actions (e.g., hold, discard, hit) selections for the initial hand to the devices 104-118 and 136-138, which can then be transmitted to and received by the table computing device 126 (412). For example, discard selections can be received at the devices 104-118 and 136-138, and transmitted to the table computing device 126. The table computing system 126 may detect (414), through a scanner 122, additional physical cards (e.g., draw cards) that are included in the current grid 127 in use. The additional cards may be included within a defined section of the grid for the game being played as shown in FIGS. 2 and 3 and selected based on their position in the grid or grid section and a draw order assigned to each player. The additional cards can be used as draw cards or as additional cards depending of the type of game being played. The additional/draw cards can be used to assemble (416) a final hand for each player and for each game. The additional/draw cards can be used in any of a variety of ways, such as through the techniques described with regard to FIGS. 5A-C.

For example, the devices 104-118 and 136-138, the table computer 126, and/or the computer system 128 can replace the discarded cards from the initial hand for each player with the drawn cards in the order in which they are within the grid. In another example, the devices 104-118 and 136-138, the table computer 126, and/or the computer system 128 can replace the discarded cards from the initial hand for each player with the drawn cards using starting draw positions that are assigned to each player so that the starting position from which the draw cards are selected can vary across the players, as discussed below with regard to FIGS. 5A-C. For instance, a first player can be assigned a starting draw position (see the description of FIG. 5B), which causes the draw cards to be inserted into open/discarded slots in the first player's hand starting at the starting draw position and progressing sequentially through the remaining draw cards, as needed. A second player can be assigned a different starting draw position, which causes the draw cards to be inserted into open/discarded slots for the second player's hand starting with the different starting position and progressing sequentially through the remaining draw cards, as needed. Accordingly, if the first player and the second player discard the same card from the initial hand, they will end up with different resulting hands. This can introduce variance in the resulting hands even though the players are playing from the same initial hand and the same draw cards, which can create varied outcomes and can mitigate risk to the house.

In another example, the players can each have an assigned order in which the draw cards are selected to replace the discards each player has selected, as described below with regard to FIG. 5C. In this example, if each of the first and second players select the same two cards to discard, they will receive two different draw cards to replace those discards according to their assigned draw order and will end up with different resulting hands. The order of draw cards can be assigned to each player in any of a variety of ways, such as through using one or more of the techniques described below with regard to FIGS. 6A-E, which can assign values to players without using random or pseudo-random number generators.

In some implementations, the players can be given a common timer (e.g., 15 seconds, 20 seconds, 30 seconds) to make their player action(s) (step 412) before additional cards are detected (step 414) and the final outcomes determined (step 416). The player's discard selections at the expiration of this timer will be locked in and used for determining the resulting hand, in combination with the additional cards. Players can be given the option to affirmatively "lock-in" their discard selections prior to expiration of the timer. If all players lock-in their discard selections in advance of the timer expiring, then the dealer can proceed with the draw cards without waiting for the timer to expire, which can permit the speed of play to increase.

The final hands for each player can be evaluated and the gaming outcome can be determined (418) for each player. For example, the devices 104-118 and 136-138, the table computer 126, and/or the computer system 128 can determine which of the final hands are winners and, if so, how much has been won by each player based on identification of the result of each of the final hands (e.g., pair, three of a kind, full house, flush), the type of game that each player is playing, a comparison of each player's result with the winning hands for the game each player is playing (e.g., winning hands start at pair of jacks or better, winning hands start at three of a kind), and identification of odds for winning hands based on the type of winning hand and/or the bet amount. The determination of whether a player has won and how much the player has won can be made, for example, at the devices 104-118 and 136-138, the table computer 126, and/or the computer system 128. As discussed above, the determination of whether a player has won is based on the physical deal of the card in the grid and the player actions-providing electronic gaming without the use of random or pseudo-random number generators.

Final hands and outcomes can be transmitted to and presented on the player devices (420). For example, the devices 104-118 and 136-138 can either generate and/or receive information identifying the final hands and the gaming outcomes (e.g., win, win amount, lose), and can output that information on the displays to the players. Gaming balances for players with winning hands can be credited (422). For example, the win amounts for players who have won based on the outcome of the final hands can be credited to corresponding user accounts, which are identified by the unique identifiers described above. The technique 400 can be selectively repeated for each individual player—with each iteration of the technique 400 corresponding to a completed game using common cards from a grid.

As discussed above with regard to FIGS. 1A-B, 2 and 3 the technique 400 can combine and/or transition between games on multiple different tables. For example, if a player has provided his/her player actions (e.g., discard selections) (412) quickly and does not want to wait for the entire gaming action period for all players at the table to provide their discard selections (or for the time period for providing discard selections to expire), the player can select an option to receive additional or replacement cards from another table. For instance, the player at device 104 can enter his/her discard selections and then select an option to receive draw cards from another table, and can be provided with the draw cards from another table (such as the table 130 or 132). Those draw cards, which are selected from the grid of physical cards being used at the other table, can be used to complete the player's final hand, as described above, and to determine the gaming outcome for the player. Other ways (other than selecting an option to obtain draw cards from another table) for obtaining draw cards are also possible, such as the player providing his/her completed discard selections within a threshold period of time of the discard period starting or ending, the player designating that he/she is ready to receive draw cards, and/or other options.

In another example, players can similarly switch between tables upon completing an electronic game (switch to a new table after the end of one iteration of the technique 400 and before starting another iteration of the technique 400). For example, a player can designate that he/she is ready to start another electronic game and can select an option to be switched to another table that is starting a new game sooner than the present table. In response to which, the player device can be switched to gaming with cards dealt on another table. Other options for switching between tables are also possible, such as providing input (e.g., designating a bet for the new game) within a threshold period of time of a game ending/a new game starting, the user designating that he/she is ready to play a new game, and/or other options.

Figure 5A:
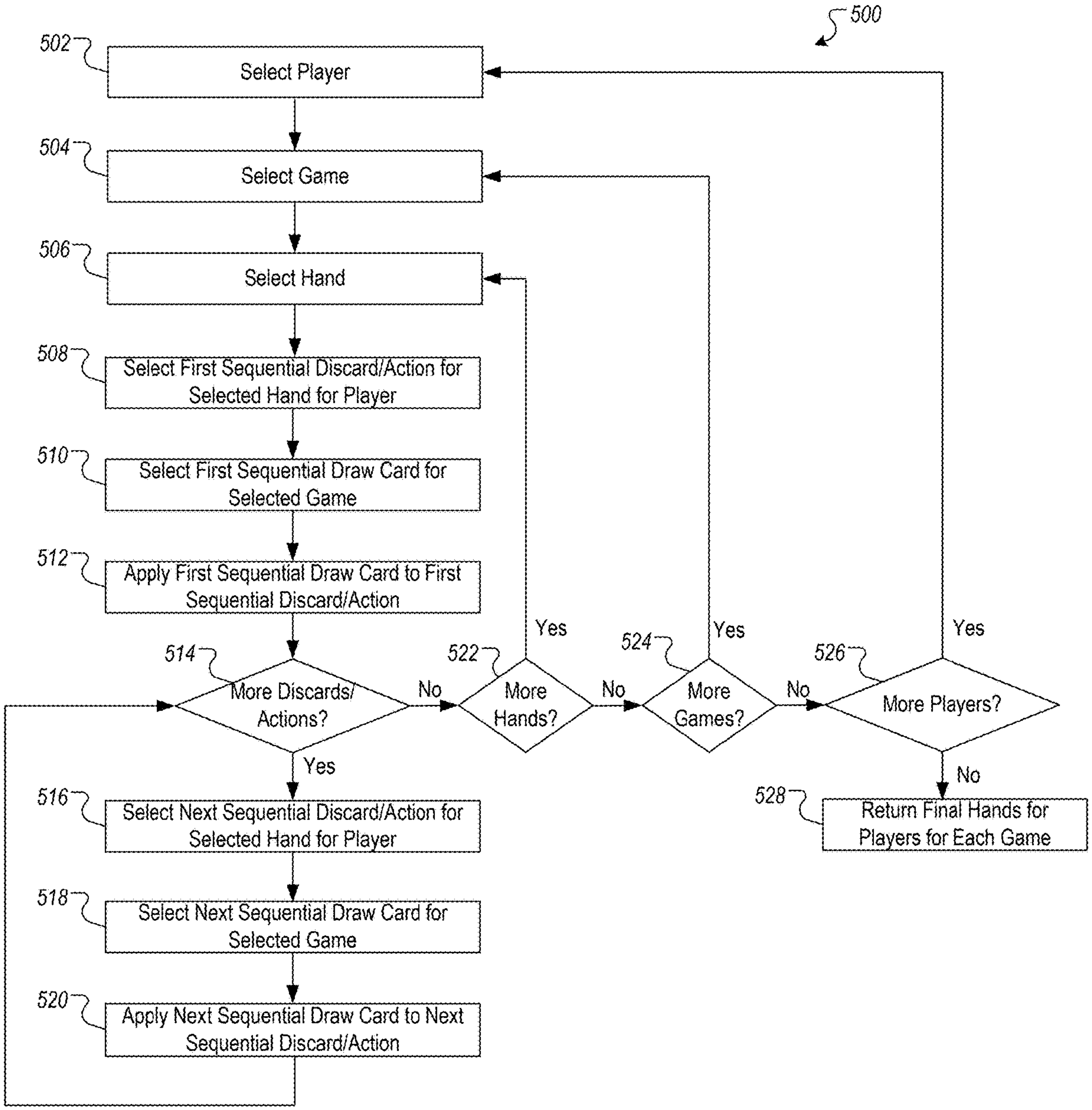
FIGS. 5A-C are flowcharts of example techniques for replacing discards in player hands from common draw cards to generate a final resulting hand for each player.
Figure 5B:
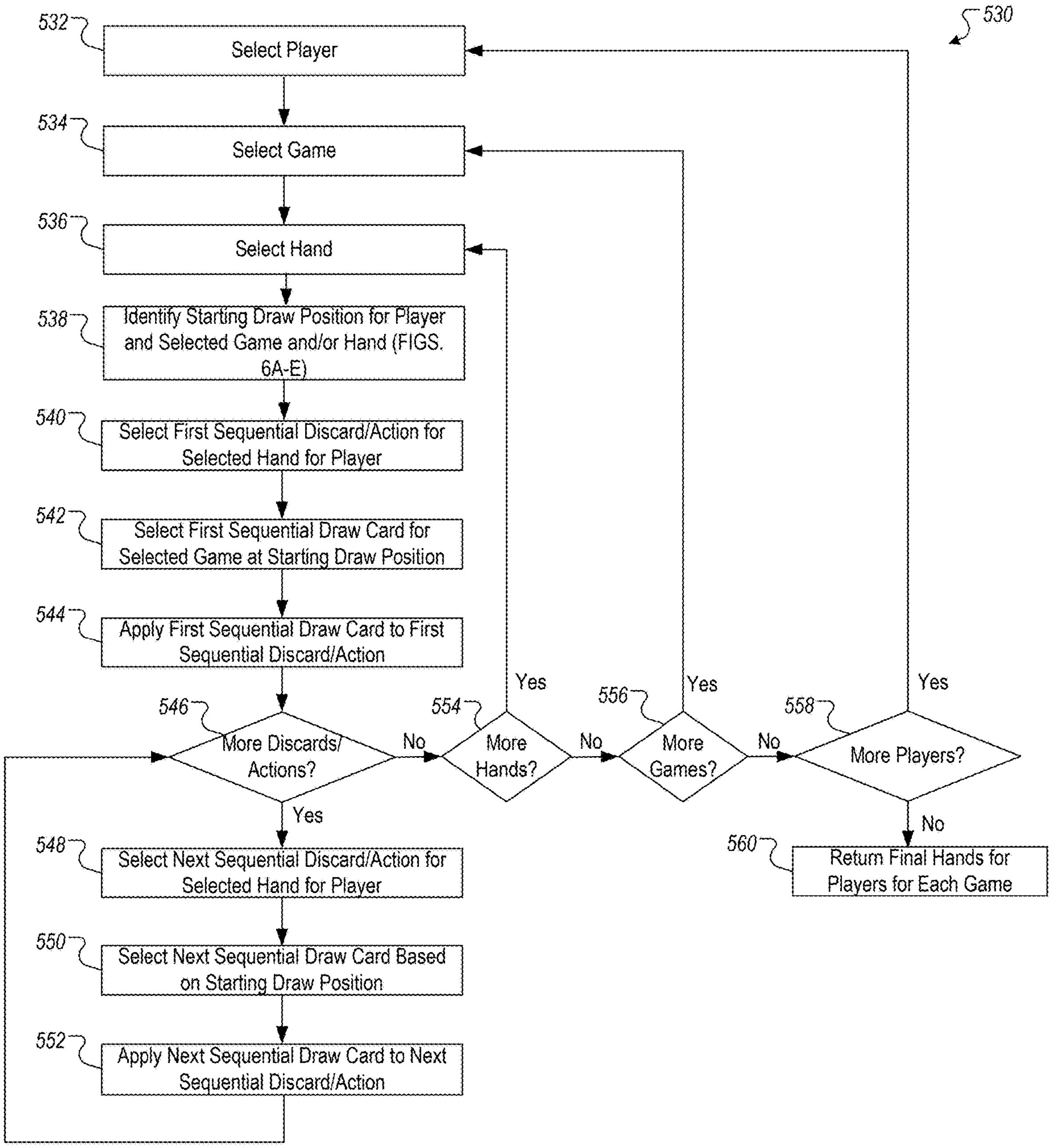
Figure 5C:
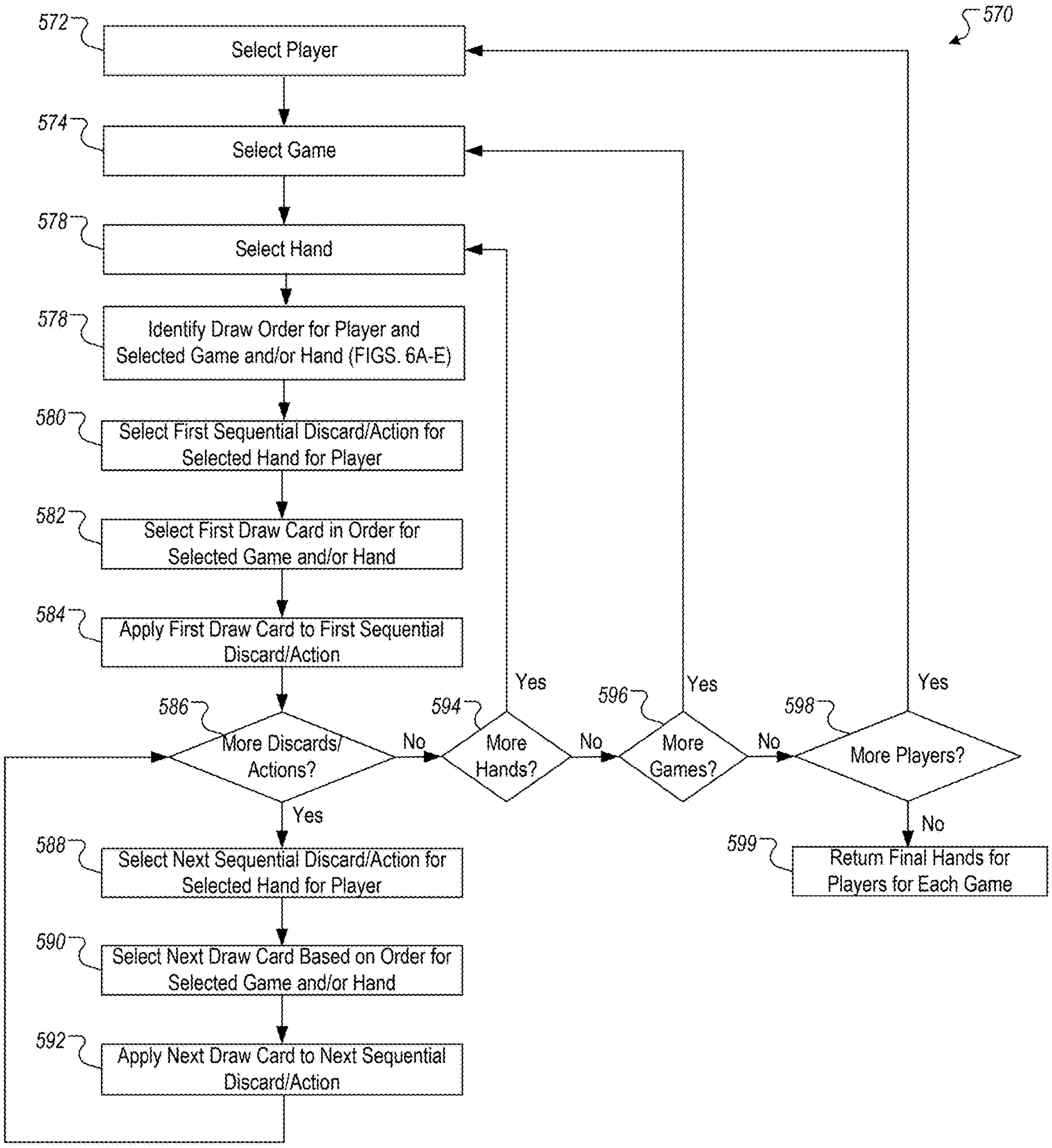

FIGS. 5A-C are flowcharts of example techniques 500, 530, and 570 for replacing discards in player hands from common draw cards to generate a final resulting hand for each player. The example techniques 500, 530, and 570 can be performed by any of a variety of appropriate computing devices and/or systems, such as the table computer system 126, the computing devices 104-118 and 136-138, and the computer system 128. The techniques 500, 530, and 570 can be performed, for example, as part of step 416 in the technique 400, as described above with regard to FIG. 4.

Referring to FIG. 5A, the example technique 500 is a technique for replacing discards in (e.g., draw poker) or providing additional cards (e.g., blackjack) to each player's hand with cards read in a sequential order from a dealt grid, such as grid 127, 200, 300, and 350, or a section of the dealt grid designated for the current game, as shown in FIGS. 2 and 3. In some implementations, the draw cards are selected from the same grid as the cards selected for the initial hand and are determined based on a sequential order with a starting positon following the last card used for the initial hand. For example, referring to FIG. 2, if cards A1-A5 were used for the initial hand, the next draw card would be B1, then B2, and so forth. In some implantations, separate grids can be used to select cards for the initial hands and for the draw cards (See FIG. 3).

For games that require draw cards (e.g., draw poker), the cards selected for a player's initial hand from a grid (step 408) can be viewed as each having a position that is established based on the order in which the draw cards were selected (i.e., the cards order in the grid) or based on an order assigned to the cards in the initial hand. When draw cards are read from the same grid or grid section as the initial cards, the starting position in the grid for reading the draw card is the next sequential card after the last card selected for the initial hand. When the draw cards are read from another grid than the cards read for the initial hand, the starting position in the other grid for reading the draw card is the first card in the other grid or section of the other grid allocated to the particular game for which the cards are being selected. Draw cards are selected by sequentially progressing through the remaining cards in the grid or grid section to fill the open spots in each player's hand resulting from player discards from the initial hand. For example, referring to grid 200, if cards A1-A5 were used as players' initial hands, the next sequential positon would be B1. A first player who discarded two cards, will receive the next two sequential cards in the grid, B1 and B2. A second player who discarded three cards, will receive the B1, B2, and B3. If a separate grid is used from the draw cards, see FIG. 3, the sequential cards used as the draw cards would be F1 and F2 for the first player and F1, F2, and F3 for the second player. Under this allocation of draw cards according to the technique 500, each player who discards the same cards from the initial hand will end up with the same resulting hand because the same draw cards will be allocated to fill the spots for the discarded cards.

As part of the technique 500, a player who is playing (either physically or virtually) at a table is selected (502). A game played by the selected player is selected (504). Followed, by selecting (506) a hand for the particular selected game and player. A first sequential discard for the selected hand is selected (508), a first sequential draw card is read from the grid or section of the grid (510), and the first sequential draw card is used to replace the first sequential discard (512). A determination is made as to whether there are any more discards that need to be replaced with additional draw cards (514). If there are more discards, then the next sequential discard card for the player is selected (516), a next sequential draw card is read from the grid or section of the grid (518), and the next sequential draw card is used to replace the next sequential discard (520).

The steps 514-520 repeat until all discards from the selected player's initial hand have been replaced with draw cards from the grid or grid section. Once all of the discards have been replaced, a check is done as to whether there are more hands that the player is playing in the selected game that have not yet had its discards replaced with draw cards read from the grid or grid section for the game (522). If there are more hands for that player in the selected game, then steps 506-520 are repeated for each hand. Once all of the discards have been replaced for each of a player's hands in a selected game, a check is done as to whether there are more games that the player is playing that have not yet had its respective hands discards replaced (524). If there are more games for that player, then steps 504-520 are repeated for each game. Once all of the discards have been replaced for each of a player's hands in all of the games in which the player is participating, a check is done as to whether there are more players physically and/or virtually playing at the table who have not yet had their discards replaced (526). If there are more players, then the steps 502-520 are repeated for each player. Once each of the discards for each of the players at a table have been processed using card read in sequential order from the grid or appropriate grid section, the final resulting hands for the players can be returned (528) and used to determine gaming outcomes, for example, at step 418 of FIG. 4.

Referring to FIG. 5B, the example technique 530 is an alternate technique for replacing discards in (or providing additional cards to) each player's hand with cards read in a sequential order from a dealt grid, such as grid 127, 200, 300, and 350, or a section of the dealt grid designated for the current game, as shown in FIGS. 2 and 3. As with the example technique 500, the draw cards may be selected from the same grid as the cards selected for the initial hand or an another grid for the draw cards. Likewise, the draw cards are selected based on a sequential order within the grid. With technique 530, however, the starting position for reading the draw cards varies among the players instead of always starting with the first card after the cards selected for the initial hand or the first draw card from the other grid of cards (as in the technique 500).

This technique 530 can provide a variety of advantages. For example, game variation in the resulting hands and in the gaming outcomes for the players at a table even though the players are using the same initial hand and the same draw cards (e.g., the cards from the Game A section, rows 202 and 204 from FIG. 2). In another example, the technique 530 can create variation without using a random number generator or pseudo-random number generator by assigning a starting draw card position to players using information associated with players, such as an identifier for the player and/or device the player is using (e.g., player identifier, device identifier, MAC address), a position selected by a player (e.g., player prompted to select starting common draw card position), and/or other information (e.g., timestamp when player gaming sessions started). In another example, the technique 530 can be implemented in a way that it creates a predictable and reliable gaming outcomes for players by assigning players a starting position that is then used to replace discards for each hand at a table for the player during a gaming session at a table. By sequentially progressing through the draw cards to replace the discards and by identifying to the player his/her assigned starting positions (as opposed to selecting the draw cards in a non-sequential manner or changing the assigned starting position from hand-to-hand without direct player input), players can understand the flow of the game, how the common draw cards are being selected to replace the discards, and can have more confidence in the fairness of the gaming system. Other advantages are also possible.

The steps of technique 530 are described below with regard to an illustrative example of this technique as depicted in FIG. 5B, which depict example game play using a grid of playing cards within an example card-based electronic gaming system, such as the example system 100. As indicated above, both of the techniques 500 and 530 (as well as 570, which is discussed in detail below) can be performed as part of step 416 in the technique 400 (FIG. 4).

As part of the technique 530, a player who is playing (either physically or virtually) at a table is selected (532). A game played by the selected player is selected (534). Followed, by selecting (536) a hand for the particular selected game and player. A starting draw position for the player's hand is identified (538). The starting draw position can be determined using any of a variety of appropriate techniques, such as the example techniques described below with regard to FIGS. 6A-E. The starting draw position can be assigned to a player when the player initiates a gaming session on a physical or virtual table and then can be used throughout the player's gaming session. Data identifying the starting draw positions assigned to players can be stored and retrieved for processing discards for each hand. Players may request the starting draw position be reselected during the player's gaming session, though features on a user interface for each player (e.g., selecting a feature in the user interface to reassign the starting draw position for the player). Multiple players on a table can have the same starting draw position.

A first sequential discard for the selected hand is selected (540), a first sequential draw card at the identified starting draw position is read from the grid or section of the grid for the current game (542), and the first sequential draw card is used to replace the first sequential discard (544). A determination is made as to whether there are any more discards that need to be replaced with additional draw cards (546). If there are more discards, then the next sequential discard card for the player is selected (548), a next sequential draw card is read from the grid or section of the grid (550), and the next sequential draw card is used to replace the next sequential discard (552).

The steps 546-552 repeat until all discards from the selected player's initial hand have been replaced with draw cards from the grid or grid section. Once all of the discards have been replaced, a check is done as to whether there are more hands that the player is playing in the selected game that have not yet had its discards replaced with draw cards read from the grid or grid section for the game (554). If there are more hands for that player in the selected game, then steps 536-552 are repeated for each hand. Once all of the discards have been replaced for each of a player's hands in a selected game, a check is done as to whether there are more games that the player is playing that have not yet had its respective hands discards replaced (556). If there are more games for that player, then steps 534-552 are repeated for each game. Once all of the discards have been replaced for each of a player's hands in all of the games in which the player is participating, a check is done as to whether there are more players physically and/or virtually playing at the table who have not yet had their discards replaced (558). If there are more players, then the steps 532-552 are repeated for each player. Once each of the discarded cards from each of the players at a table have been processed using card read in sequential order from the grid or appropriate grid section, the final resulting hands for the players can be returned (560) and used to determine gaming outcomes, for example, at step 418 of FIG. 4.

As an example of employing technique 530 within an electronic gaming system with reference to grid 200 from FIG. 2, the cards in Game A section if grid 200 may be used for a five-card draw poker game, where cards in row 202 (A1-A5) are used as the initial hand for the players and the cards in row 204 (B1-B5) are used for the players draw cards. Continuing with the example, a first player can be assigned a starting position of the second draw car (B2)—meaning that the second draw card (instead of the first draw card (B1), as with the technique 500) is selected to replace the first discard for the first player. The draw card selection sequentially proceeds from B2 for additional discards (e.g., the third draw card, B3, is selected to replace the second discard for the first play and so forth). A second player in the example, however, may be assigned a starting position of the fourth draw card (B4)—meaning that the fourth draw card (instead of the first draw card, as with technique 500 or the second draw card as with the first example player) is selected to replace the first discard for the second player. The draw card selection sequentially proceeds from B4 (i.e., B4→B5→B1→B2) for additional discards. Since the first player and the second player in this example have different starting positions, they will end up with different resulting hands (except if they both discard all five cards from the initial hand) even if they discard the same cards from the initial hand. For instance, if both the first and second players select cards A2 and A4 from their initial hands as discards, employing technique 530, the electronic gaming system replaces the discards according each players starting position and the content of the grid. Accordingly, the discards (A2 and A4) from the first player's hand would be replaced with B2 and B3 respectively, while the same discards from the second player's hand would be replaced with B4 and B5 respectively. Thus, the resulting hand for the first player—A1, B2, A3, B3, A5—is different from the resulting hand of the second player—A1, B4, A3, B5, A5—even though each player selected the same discards from the same initial hand and the draw cards were selected from the same row of cards 204 from grid 200. As described above, the starting position can be determined and assigned to the players when they join the table (e.g., initiates a new gaming session) according to the techniques described in FIGS. 6A-E.

In an alternative implementation, the entire grid 200 (see FIG. 2) may be used for the five-card draw poker game. In such an implementation, the cards in row A1-A5 may again be used as players' initial hands, however, the draw cards may be selected sequentially outside of the Game A section. In such an implementation, for example, the sequential card selection order for a player that is assigned a starting position of the fourth draw card (B4), such as the second player above, may be implemented as B4→B5→C1→C2 for additional discards. Other techniques for determining the next sequential draw card can be used, such as moving backward along the draw positions until the first draw position is reached (e.g., selecting draw card B4 after B5 has been selected) instead of looping back to the first position.

Referring to FIG. 5C, the example technique 570 is an alternate technique for replacing discards in (or providing additional cards to) each player's hand with cards read in a sequential order from a dealt grid, such as grid 127, 200, 300, and 350, or a section of the dealt grid designated for the current game, as shown in FIGS. 2 and 3. As with the example technique 500 and 530, the draw cards may be selected from the same grid as the cards selected for the initial hand or an another grid for the draw cards. Likewise, the draw cards are selected based on a sequential order within the grid. With technique 570, however, the slotting varies among the players according to a draw order that is assigned to each player (or alternatively to each player's individual hand). Furthermore, technique 570 differs from technique 530, where only the starting position for the draw card varies across the players; however, with the technique 570, the order with which each of the draw cards are selected to replace the discards can vary (i.e., the selection order is may not be sequential).

For example, a first player can have an assigned draw order that differs from the assigned draw order of a second player at each position-meaning that a different draw card is selected for each player for each discard. The technique 570 can create greater variation in the resulting hands than the technique 530. For example, assuming the use of row 204 (B1-B5) from the Game A section of grid 200 as the draw cards for the game, the technique 450 can provide five variations in the resulting hands across the players by assigning one of five different starting positions to each player. In contrast, the technique 570 can provide 120 variations (5×4×3×2×1) in the resulting hands across the players by assigning one of the 120 different draw orders that are possible across a set of five draw cards. Accordingly, the technique 570 can provide the same or, in some instances, greater advantages over the techniques 500 and 530 by injecting greater variation in outcomes across the players. Additionally, the technique 570 can provide other advantages, such as identifying to the player his/her assigned draw order as well as increasing players understand regarding the flow of the game and how the common draw cards are being selected to replace the discards, all of which may serve to increase player confidence in the fairness of the gaming system. Other advantages are also possible.

The steps of technique 570 are described below with regard to an illustrative example of this technique as depicted in FIG. 5C, which depict example game play using a grid of playing cards within an example card-based electronic gaming system, such as the example system 100.

As indicated above, the techniques 500, 530, and 570 can be performed as part of step 416 in the technique 400 (FIG. 4).

As part of the technique 570, a player who is playing (either physically or virtually) at a table is selected (572). A game played by the selected player is selected (574). Followed, by selecting (576) a hand for the particular selected game and player. A starting draw order for the player's hand is identified (578). The starting draw order for a player can be a non-sequential sequence of draw positions and can be determined using any of a variety of appropriate techniques, such as the example techniques described above with regard to FIGS. 6A-E. For example, even though each of the example techniques in FIGS. 6A-E select only a starting draw position for a player, each of these techniques can be repeatedly performed (e.g., performed 5 times) to select a draw order for the player. Additionally, these techniques in FIGS. 6A-E can be combined to select the draw order for a player, with different techniques being used to select different portions of the draw order. Data identifying the order assigned to players can be stored and retrieved for processing discards for each hand. Players may request the draw order be reselected during the player's gaming session, through features on a user interface for each player (e.g., selecting a feature in the user interface to reassign the draw order for the player). Multiple players on a table may have the same draw order, although there are more possible variation (120 variations for a set of five cards) in the draw order than variations in the starting position (5 variations, as discussed above with regard to the technique 530).

A first sequential discard for the selected hand is selected (580), the first draw card at the identified starting draw position is read from the grid or section of the grid for the current game (582), and the first sequential draw card is used to replace the first sequential discard (584). A determination is made as to whether there are any more discards that need to be replaced with additional draw cards (586). If there are more discards, then the next sequential discard card for the player is selected (588), a next draw card is read from the grid or section of the grid based of the player's (or hand's) draw order (590), and the next sequential draw card is used to replace the next sequential discard (592).

The steps 586-592 repeat until all discards from the selected player's initial hand have been replaced with draw cards from the grid or grid section. Once all of the discards have been replaced, a check is done as to whether there are more hands that the player is playing in the selected game that have not yet had its discards replaced with draw cards read from the grid or grid section for the game (594). If there are more hands for that player in the selected game, then steps 576-592 are repeated for each hand. Once all of the discards have been replaced for each of a player's hands in a selected game, a check is done as to whether there are more games that the player is playing that have not yet had its respective hands discards replaced (596). If there are more games for that player, then steps 574-592 are repeated for each game. Once all of the discards have been replaced for each of a player's hands in all of the games in which the player is participating, a check is done as to whether there are more players physically and/or virtually playing at the table who have not yet had their discards replaced (598). If there are more players, then the steps 572-592 are repeated for each player. Once each of the discarded cards from each of the players at a table have been processed using card read in sequential order from the grid or appropriate grid section, the final resulting hands for the players can be returned (599) and used to determine gaming outcomes, for example, at step 418 of FIG. 4.

As an example of employing technique 570 within an electronic gaming system with reference to grid 200 from FIG. 2, the cards in Game A section if grid 200 may be used for a five-card draw poker game, where cards in row 202 (A1-A5) are used as the initial hand for the players and the cards in row 204 (B1-B5) are used for the players draw cards. Continuing with the example, a first player may be assigned a draw order of 2-1-5-3-4 (second draw card→first draw card→fifth draw card→third draw card→fourth draw card), a second player may be assigned a draw order of 5-3-1-4-2 (fifth draw card→third draw card→first draw card→fourth draw card→second draw card), and a third player may be assigned starting draw position of 4-3-5-2-1 (fourth draw card→third draw card→fifth draw card→second draw card→first draw card). As described above, the draw order can be determined and assigned to the players when they join the table (e.g., initiates a new gaming session) according to the techniques described in FIGS. 6A-E (as modified to be performed multiple times to select the draw order), and then used to replace discards for the players, as described with regard to the technique 570. Each player selects cards A2 and A4 from their initial hands as discards. Employing technique 570, the electronic gaming system replaces the discards according each players draw order. Accordingly, the discards from the first player's hand would be replaced with B2 and B1 respectively, the discards from the second player's hand would be replaced with B5 and B3 respectively, and the discards from the third player's hand would be replaced with B4 and B3 respectively. Thus, the resulting hand for the first player—A1, B2, A3, B1, A5—is different from the resulting hand of the second player—A1, B5, A3, B3, A5—each of which is different from the resulting hand of the third player—A1, B4, A3, B3, A5—even though they each selected the same discards from the same initial hand and the draw cards were selected from the same row of cards 204 from grid 200.

FIGS. 6A-E are flowcharts of example techniques 600, 620, 640, 660, and 680 for assigning starting draw positions to players. The example techniques 600, 620, 640, 660, and 680 can be performed by any of a variety of appropriate computing devices and/or systems, such as the table computer system 126, the computing devices 104-118 and 136-138, and the computer system 128. The techniques 600, 620, 640, 660, and 680 can be performed, for example, as part of step 302 in the technique 300 as described above with regard to FIG. 4, and/or as part of step 478 in the technique 570, as described above with regard to FIG. 5C.

Figure 6A:
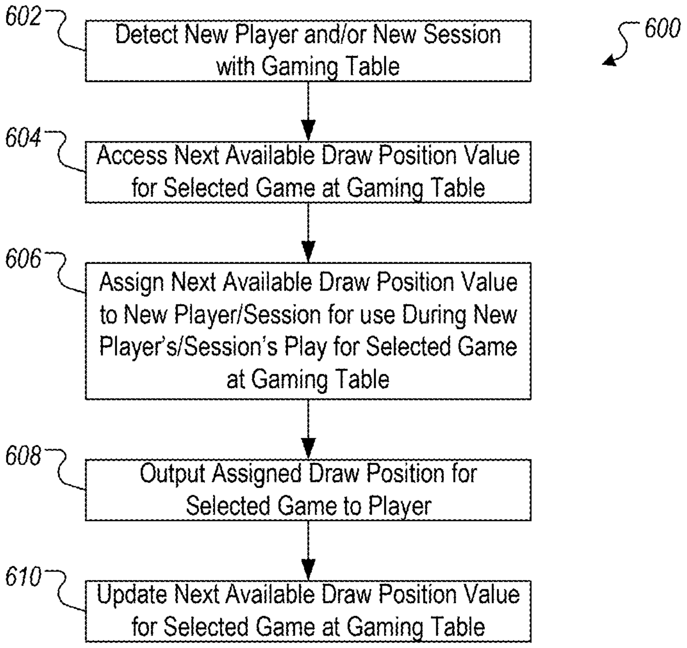
FIGS. 6A-E are flowcharts of example techniques for assigning starting draw positions to players.

Referring to FIG. 6A, the example technique 600 assigns starting draw positions to players by repeatedly cycling through the starting positions as players initiate a gaming session on a physical or virtual table. For example, a first player who joins a table can be assigned the first draw position, a next player who joins the table can be assigned the next draw position (second draw position), and then a next player who joins the table can be assigned the next draw position (third draw position). After the last/fifth draw position is reached, the process can cycle back to the first draw position for a next player who joins the table. This technique 600 can be performed repeatedly for each table as players join the gaming action. The technique 600 can provide any of a variety of advantages. For example, the technique 600 can provide a more even distribution of players at a table across the different starting draw positions while at the same time doing this without relying on a random or pseudo-random number generator.

A new player and/or new gaming session on a gaming table can be detected (602). For example, a player can join the gaming table 102 by either physically using one of the computing devices/displays 104-118 at the table 102 or by using a remote computing device 136-138 to remotely connect to the action on the table 102. In another example, a player who is already playing on a gaming table may manually initiate step 602 and the technique 600 by selection an option to reassign the starting draw position for the player.

A next available draw position value for the gaming table can be accessed (604) and can be assigned to the new player and/or session for use during the player's play on the gaming table (606). For example, the system 100 can store a next available draw position value that is incremented and then, once the end/fifth draw position is assigned, cycled back through to the first draw position. Alternatively, this value can be decremented and then cycled back to the fifth draw position once the first draw position is used/exhausted. In another example, as described above, each player can be assigned a next available row (example draw position) from among multiple different rows of cards to use as draw cards (e.g., players given option to select a row from among rows 312-320). The assigned draw position for the user can be output to the player, such as on the computing devices/displays 104-118, so that the player is aware of the draw position that will be used for the player's gaming action (608). This value can be referenced when a new player/session is being initiated and can be assigned to the player, and then can be updated (e.g., incremented, decremented) for use with the next player/session that joins the table (610).

Figure 6B:
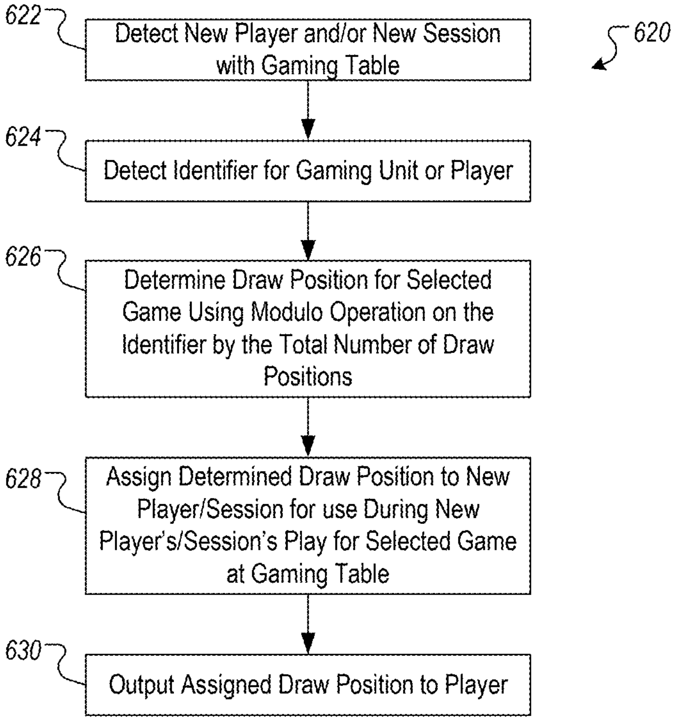

Referring to FIG. 6B, the example technique 620 assigns starting draw positions to players using identifiers for the gaming unit and/or player, as opposed to using random or pseudo-random numbers. Like step 602, a new player and/or session is detected with a gaming table (622) and an identifier for the gaming unit that is going to be used and/or an identifier for the player is detected (624). For example, an identifier for the local computing devices/displays 104-118 and/or the remote computing devices 136-138 can be identified, such as a unique identifier used by the system 100 to identify the devices 104-118, 136-138, MAC addresses for these devices, and/or other device identifiers. Additionally and/or alternatively, an identifier for the player can be detected, such as an ID on a player gaming card/account.

The starting draw position for the player can be determined by applying a modulo operation to the detected identifier and the total number of draw positions (5 draw positions) (626). A modulo operation is an operation that involves dividing a number by a denominator (5) and receiving the remainder value. For example, if the identifier for the player is 123, performing the modulo operation on this identifier with the denominator 5 returns the value 3 (e.g., 123% 5=3). Performing the modulo operation returns values 0-4 regardless of the numerator that is being used. These values (0-4) can be used to assign the draw position for the new player/session (628). In some instances, these values (0-4) from the modulo operation can serve as the draw position itself. In some instances, these values (0-4) can be modified, such as being incremented by one, to generate the draw position. In another example, as described above, each player can be assigned a row (example draw position) from among multiple different rows of cards to use as draw cards (e.g., players given option to select a row from among rows 312-320) based on the determined values for the players. Once assigned, the draw position can be output to the player (630), similar to the step 610.

Figure 6C:
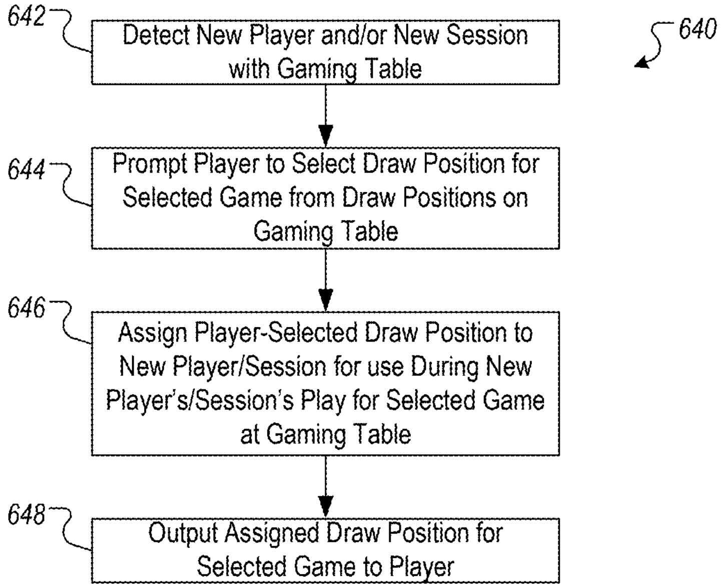

Referring to FIG. 6C, the example technique 640 assigns starting draw positions to players by permitting the players to manually select their starting positions. Like step 602, a new player and/or session is detected with a gaming table (642) and the player is provided with a prompt to select from among draw positions on the gaming table (644). For example, when a player joins a gaming table and/or initiates a new gaming session, the user interface that the player is using can provide the player with selectable options (e.g., five buttons with values 1-5 that the player can select) for the starting draw position that will be used for the player's gaming session on the table. In another example, as described above, each player can be presented with an option to select from among multiple different rows of cards to use as draw cards (e.g., players given option to select a row from among rows 312-320). The player-selected draw position can be assigned to the player (646) and can be output on the device to confirm the selection to the user (648).

Figure 6D:
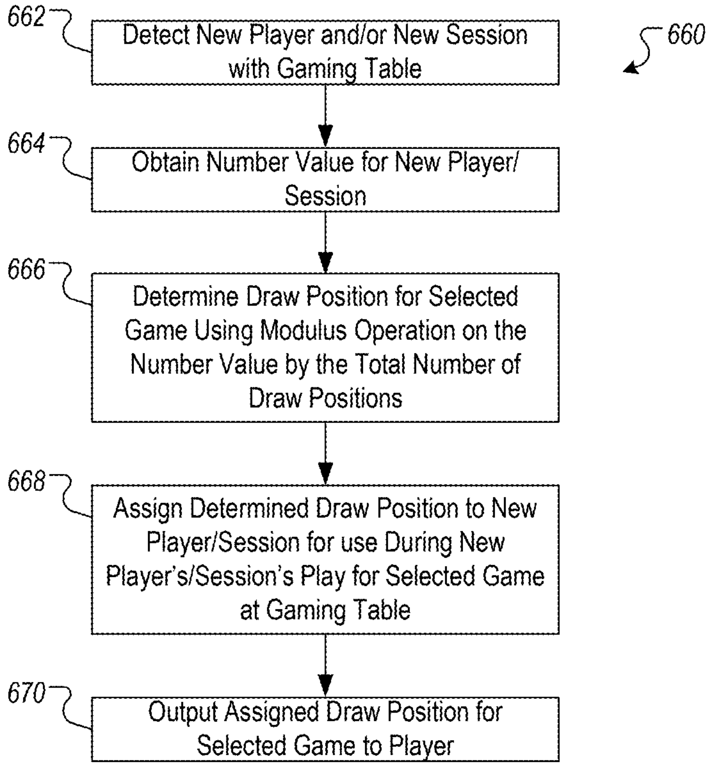

Referring to FIG. 6D, similar to the technique 620, the example technique 660 obtains a value associated with the new player and/or new session, and uses that value to determine the starting draw position to assign to the player. Like steps 622 and 624, the new player and/or new session on the gaming table can be detected (662) and a number value for the new player and/or session can be obtained (664). The number value can be an identifier, like with the technique 620, and/or other values, such as a timestamp when the player initiated his/her gaming session, combinations of values (e.g., multiplication, addition, division, or other operation combining an identifier for the device and other values), and/or other values. Like steps 626 and 628, the draw position can be determined by using the modulus operation and the number value (666) and can be assigned to the user (668). As with the step 630, the assigned draw position can be output to the user (670).

Figure 6E:
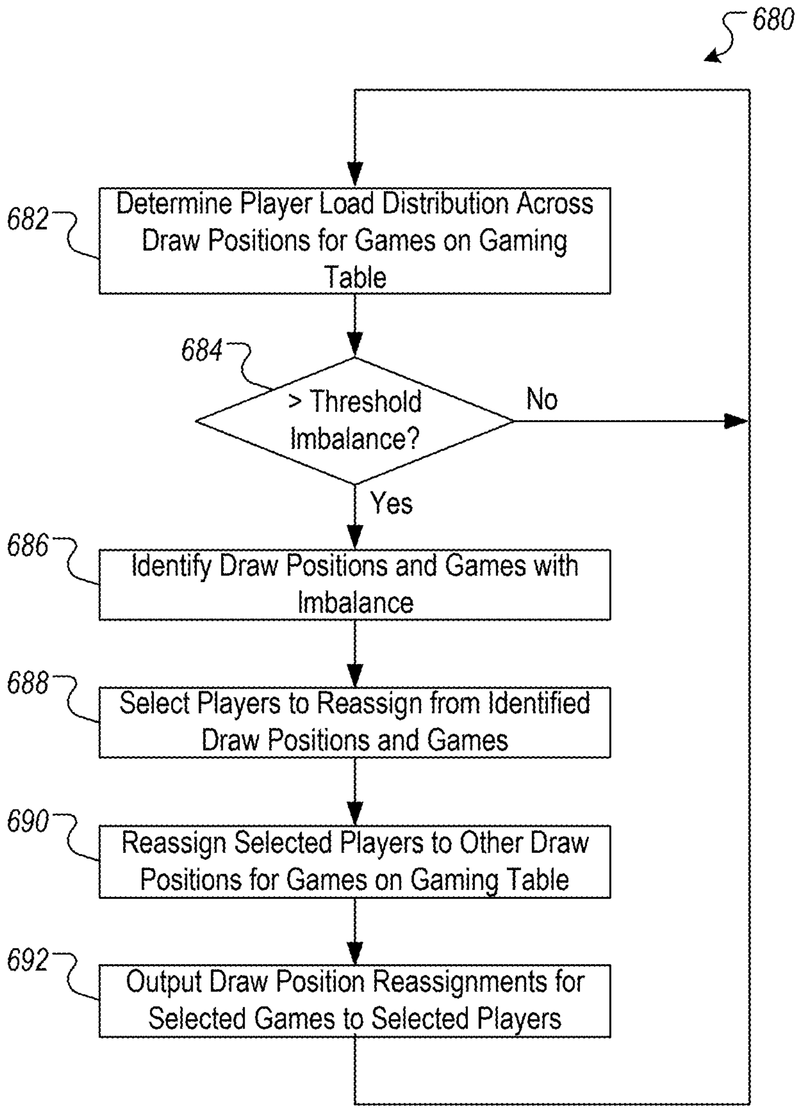

Referring to FIG. 6E, the technique 680 performs load balancing on the distribution of players across the starting draw positions on a gaming table. The technique 680 can be performed periodically (e.g., every 15 minutes, 30 minutes, 45 minutes, 1 hour, 2 hours) and can be used to ensure that no single starting draw position has greater than a threshold amount (e.g., percentage, raw number) of the players relative to the other starting draw positions.

Player load distributions across the draw positions on the gaming table can be determined (682). For example, the number of current players that are assigned to each draw position can be identified. A determination can be made as to whether there is greater than a threshold imbalance in this distribution (684). Such a threshold imbalance can be indicated by one of the draw positions exceeding a threshold amount of assigned players. For example, with an even distribution each of the five draw positions will have 20% of the players. However, if one or more of the draw positions (e.g., draw position 2) deviates significantly above this even distribution value (e.g., draw position has greater than 40%, 50%, 60%, 70% of the distribution), the resulting imbalance can potentially increase the liability exposure for the house and it can be desirable to rebalance the assignment of players across the five draw positions. Additionally and/or alternatively, the rebalancing can be performed based on an average amount that players are betting so that there is a more even distribution in the aggregate amount that is being wagered for each of the draw positions. For example, one player betting an average of $500/hand may be assigned to a first draw position and each of the other draw positions may be assigned ten players betting $5/hand to provide a more even distribution of the amount wagered per draw position.

When it is determined that there is greater than a threshold imbalance, the specific draw positions that have the imbalance can be identified (686), a portion of the players from those draw positions be selected for reassignment (688), and the selected players can be assigned to other draw positions (690). For example, if the second draw position has greater than a threshold percentage of the assigned players, then the second draw position can be identified as having imbalance and a portion of the players assigned to the second draw position can be selected for reassignment. Any of a variety of appropriate processes for selecting players for reassignment can be used, for example, players who most recently joined the table can be selected in reverse chronological order until a sufficient number of players to remedy the imbalance have been selected for reassignment. Other techniques for selecting players without using random or pseudo-random number generators can also be used. The reassignment of these selected players can be performed according to one or more of the techniques 600, 620, 640, and 660. The new draw positions for the reassigned players can be output on the devices for each of the reassigned plyers (692).

In addition to the features described above, game play can continue with one or more additional rounds of players making discard selections and common cards being dealt to replace the discard selections. For example, players can have two rounds of discards—involving two sets of common cards being dealt—before the final resulting hands are generated and gaming outcomes are determined. Payouts for such multi-round discards and common draw card replacements may, in some instances, be decreased over the payouts for a single round of discards and common draw cards. Such single vs. multi-round discard/common draw cards in game play may be static and fixed at the outset on a table (e.g., a first table provides only one round of discards whereas a second table provides only two round discards), or it may be dynamically selected by the players at the table. For example, players may be given the option of whether to enter additional rounds of discards and common draw cards in exchange for the payouts on resulting hands decreasing. Such options can be presented before each hand commences, and/or after the first round of discards has concluded.

Figure 7:
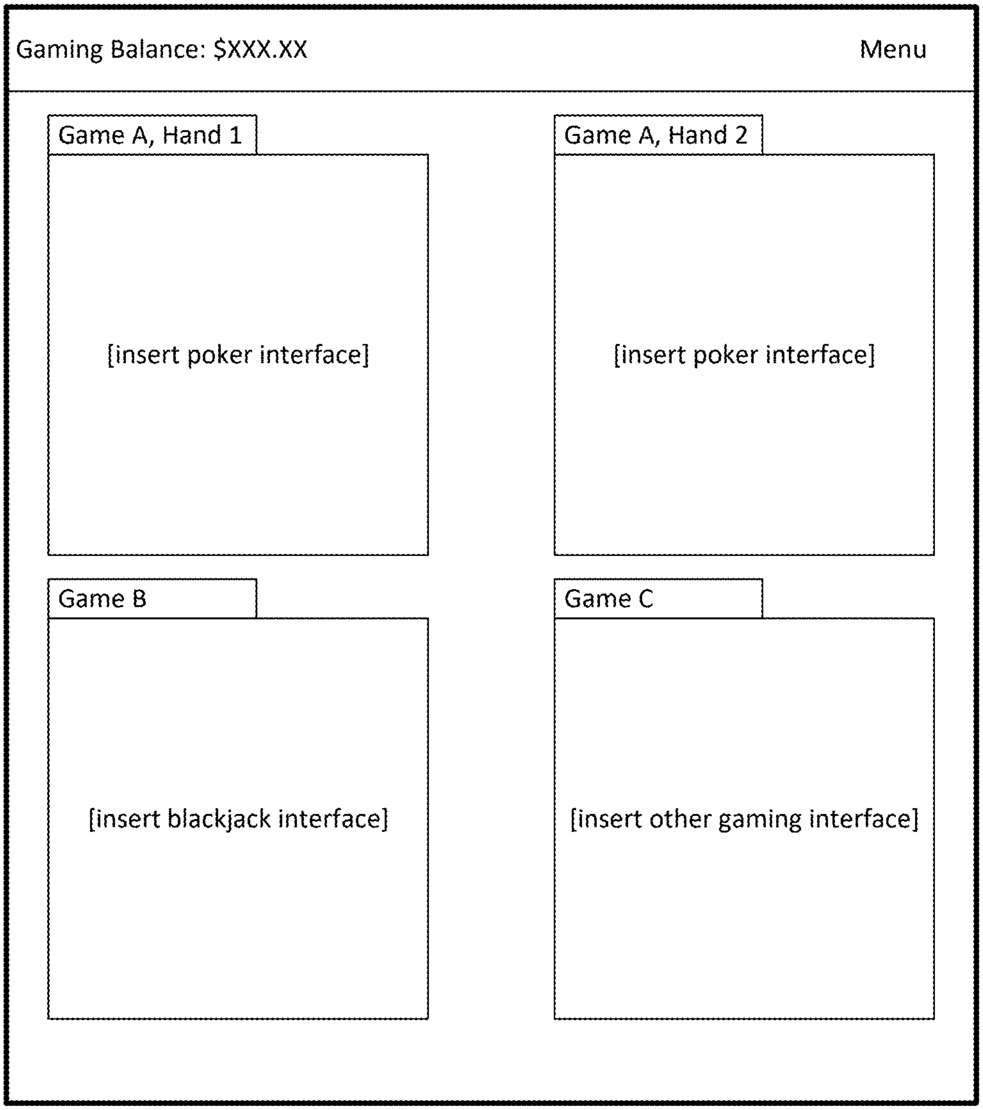
FIG. 7 shows an example interactive touchscreen gaming interface that can be displayed on a computing device to provides players access to games managed by an electronic gaming system.

FIG. 7 shows an example interactive touchscreen gaming interface 700 that can be displayed on, for example, computing devices 104-118 and 136-138, to provides player access to games managed by electronic gaming system 100. Gaming interface 700 includes gaming balance component 710, menu component 712, and gaming interface windows 720-726. Gaming balance component 710 displays the respective player's current gaming balance in the electronic gaming system. Menu component 712 provides access to various menu options (not shown) accessible by the player. For example, a player may select the menu component 712 to add or change a game or the table on which a game is being currently being played in one of the gaming interface windows 720-726.

Gaming interface windows 720-726 display the interface for each of the games being played by a player. In the depicted example, the display shown on gaming interface window 720 is for Game A, Hand 1, which may be a five-card draw poker game. The display shown on gaming interface window 722 is for the same game, Game A, but for a second hand, Hand 2, that the players is playing in that game. The display shown on gaming interface window 724 is for Game B, which may be a black jack game. The display shown on gaming interface window 726 is for Game C, which may be for yet another table game offered by the respective electronic gaming system. In the depicted example, four gaming interface windows are shown; however, any number of windows may be used for a given gaming interface based on the number of games the player is currently playing and/or a maximum number of concurrent games allowed for each player using the electronic gaming system.

Figure 8:
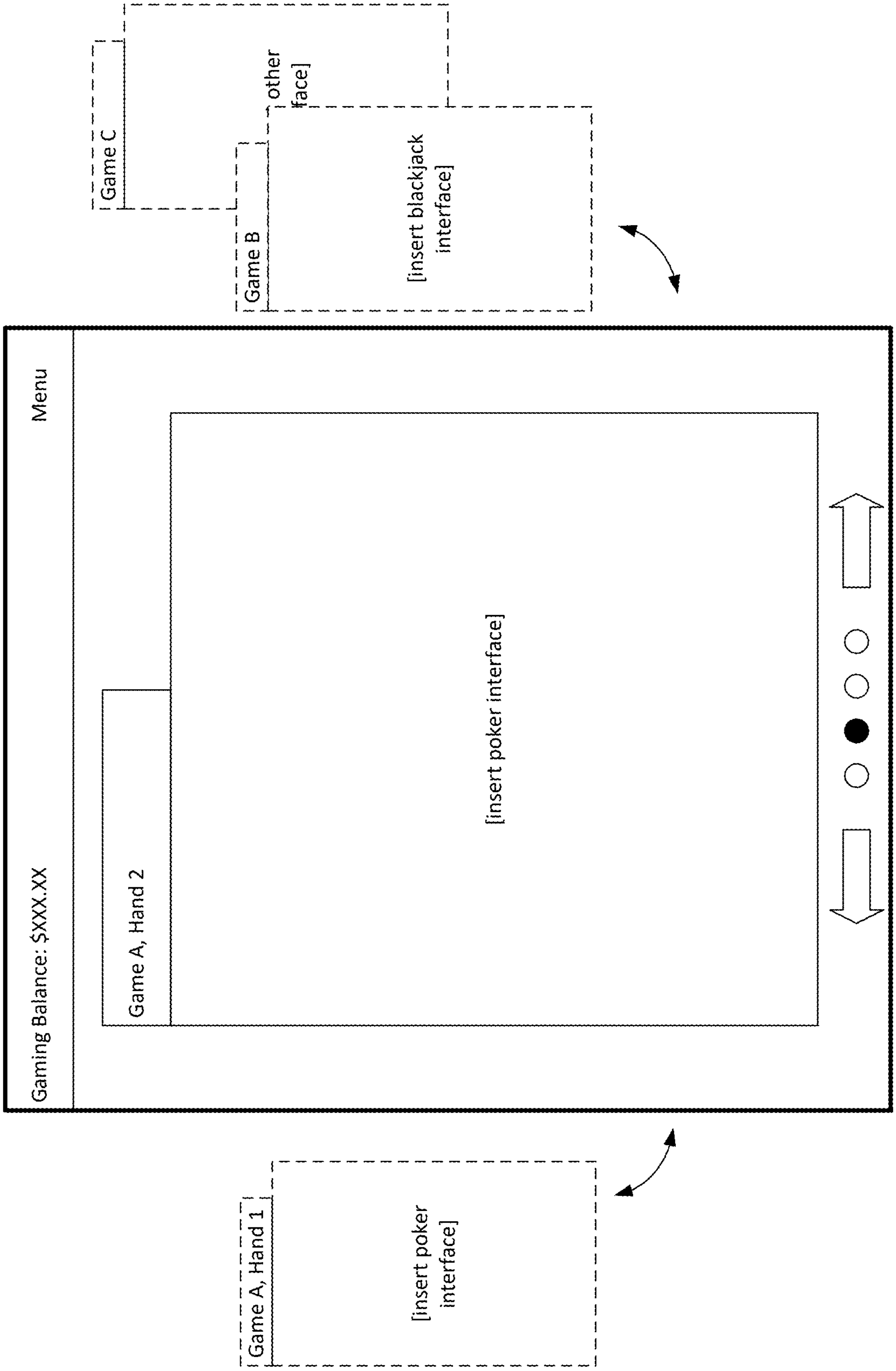
FIG. 8 shows another example interactive touchscreen gaming interface that can be displayed on a computing device to provides players access to games managed by an electronic gaming system.

FIG. 8 shows another example interactive touchscreen gaming interface 800 that can be displayed on, for example, computing devices 104-118 and 136-138, to provides player access to games managed by electronic gaming system 100. The components of gaming interface 800, gaming balance component 810, menu component 812, and gaming interface windows 820-826, are substantially similar to the components of gaming interface 700. Additionally, gaming interface 800 includes a swiping component 830 that allows a player to swipe or toggle through the gaming interface windows 820-826 (i.e., the current games being played).

In some implementations, a player may swipe through the gaming interface windows 820-826 by interacting with the touchscreen (i.e., swiping left or right). As with FIG. 7 above, the depicted example shows four gaming interface windows; however, any number of windows may be used for a given gaming interface based on the number of games the player is currently playing and/or a maximum number of concurrent games allowed for each play using the electronic gaming system.

Figure 9:
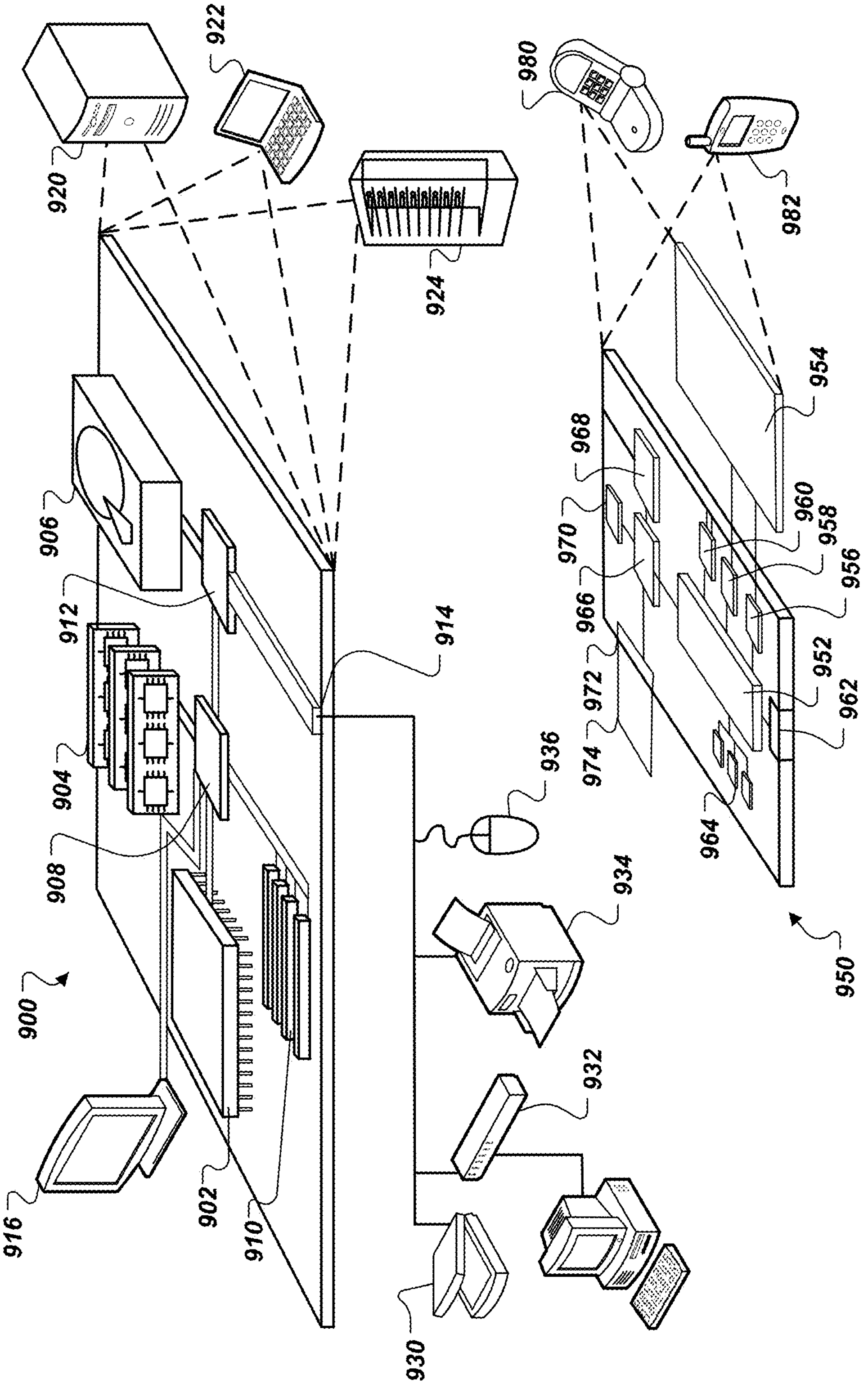
FIG. 9 shows an example of a computing device and a mobile computing device that can be used to implement the techniques described here.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. Additionally, computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards. In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices. Such input/output devices may include a scanner 930, a printing device 934, or a keyboard or mouse 936. The input/output devices may also by coupled to the low-speed expansion port 914 through a network adapter. Such network input/output devices may include, for example, a switch or router 932.

The computing device 900 may be implemented in a number of different forms, as shown in the FIG. 9. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. For example, the processor 952 may be a Complex Instruction Set Computers (CISC) processor, a Reduced Instruction Set Computer (RISC) processor, or a Minimal Instruction Set Computer (MISC) processor. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a Thin-Film-Transistor Liquid Crystal Display (TFT) display or an Organic Light Emitting Diode (OLED) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a Single in Line Memory Module (SIMM) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 968 using a radio-frequency. In addition, short-range communication may occur, such as using a Bluetooth, Wi-Fi, or other such transceiver. In addition, a Global Positioning System (GPS) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. An electronic gaming system to provide multiple electronic games based on physical playing cards, the electronic gaming system comprising:

- a plurality of physical playing cards that are physically dealt by a dealer;
- a scanner that is configured to identify each physical playing card of the plurality of physical playing cards as they are dealt;
- a plurality of player computing devices that are configured to provide individualized gaming interfaces for a plurality of players; and
- a gaming computing device that is communicably connected to the scanner and the plurality of player computing devices, the gaming computing device being configured to perform operations comprising:
  - identifying cards from the plurality of physical playing cards,
  - generating data representative of each of the identified cards,
  - generating initial gaming actions for the plurality of player computing devices, wherein at a portion of the initial gaming actions includes one or more common cards from the identified cards,
  - transmitting the data representative of cards in the initial gaming actions to the plurality of player computing devices, wherein the plurality of player computing devices are configured to, based on the data, (i) provide an electronic gaming experience comprising a game that corresponds to a type of game selected by players associated with the plurality of player computing devices, and (ii) present, in a respective graphical user interface (GUI) display, an electronic representation of the cards in the initial gaming actions and at least one selectable option to perform a gaming action in the game, wherein the electronic representation of the cards in the initial gaming action and the at least one selectable option to perform the gaming action in the game are presented as graphical elements, wherein at least one of the graphical elements is configured to visually overlay at least a portion of a graphical representation that corresponds to the type of game that was selected by the respective player, receiving, from the plurality of player computing devices, gaming actions based on providing the electronic gaming experience comprising the game at the plurality of player computing devices, determining gaming outcomes for the players of the plurality of player computing devices based on the type of game selected by the players, the data representative of the at least one of the identified cards, and the gaming actions, and transmitting the gaming outcomes for the players to the plurality of player computing devices.

2. The electronic gaming system of claim 1, further comprising:

a gaming table that allows the dealer to deal the plurality of physical playing cards, wherein the scanner is configured to read one or more of the plurality of physical playing cards for the gaming table.

3. The electronic gaming system of claim 2, wherein the plurality of player computing devices comprises at least a first player computing device that is physically located at the gaming table and at least a second player computing device that is physically remote from the gaming table.

4. The electronic gaming system of claim 1, wherein the dealer is a human dealer.

5. The electronic gaming system of claim 1, wherein the dealer is a robot.

6. The electronic gaming system of claim 1, wherein identifying cards from the plurality of physical playing cards comprises selecting a portion of the physical playing cards from the plurality of physical playing cards.

7. The electronic gaming system of claim 1, wherein:

at least one of the plurality of player computing devices comprises a first player computing device and a second player computing device, and the gaming computing device is configured to transmit the data representative of the cards in the initial gaming actions to the first player computing device and the second player computing device, wherein the first player computing device is configured to provide an electronic gaming experience comprising a game of a first type and the second player computing device is configured to provide an electronic gaming experience comprising a game of a second type using the same data representative of the cards in the initial gaming actions.

8. The electronic gaming system of claim 7, wherein the first type and the second type are different types of games.

9. The electronic gaming system of claim 7, wherein the first type and the second type are a same type of game.

10. The electronic gaming system of claim 7, wherein the first player computing device is configured to provide the electronic gaming experience comprising the game of the second type and the second player computing device is configured to provide the electronic gaming experience comprising the game of the first type.

11. The electronic gaming system of claim 7, wherein the first player computing device and the second player computing device are configured to provide an electronic gaming experience comprising a game of a same type at a same time.

12. The electronic gaming system of claim 7, wherein the first player computing device and the second player computing device are configured to provide an electronic gaming experience comprising a game of a same type at different times.

13. The electronic gaming system of claim 1, wherein the plurality of player computing devices is configured to provide an electronic gaming experience comprising multiple games at once for the players.

14. The electronic gaming system of claim 1, wherein the type of game is selected from among a group comprising: Blackjack, Poker, Baccarat, Slots, Craps, Roulette, Casino war, Faro, Red Dog, Teen Patti, Trente et Quarante, Chuck-a-luck, Pai Gow, Sic bo, Big Six wheel, Fan-Tan, Two-up, Jacks or Better, Tens or Better, Deuces Wild, Bonus Poker, and Double Bonus Poker.

15. The electronic gaming system of claim 1, wherein the scanner is selected from among a group comprising: an RFID reader, an optical scanner, and a camera.

16. The electronic gaming system of claim 1, wherein transmitting the data representative of the cards in the initial gaming actions causes the plurality of player computing devices to each present, in the respective GUI display, an electronic representation of each game amongst a plurality of games that the respective player is playing.

17. The electronic gaming system of claim 1, wherein the identified cards are used across a plurality of games at the plurality of player computing devices.

18. The electronic gaming system of claim 1, wherein providing the electronic gaming experience comprising the game that corresponds to the type of game selected by the players at the plurality of player computing devices includes presenting output with selectable options for the players to identify the cards from amongst the plurality of physical playing cards.

19. An electronic gaming system to provide multiple electronic games based on physical playing cards, the electronic gaming system comprising:

a plurality of physical playing cards that are physically dealt by a dealer;

a scanner that is configured to identify each physical playing card of the plurality of physical playing cards as they are dealt;

a plurality of player computing devices that are configured to provide individualized gaming interfaces for a plurality of players, wherein at least one of the plurality of player computing devices comprises a first player computing device and a second player computing device; and a gaming computing device that is communicably connected to the scanner and the plurality of player computing devices, the gaming computing device being configured to perform operations comprising:

identifying cards from the plurality of physical playing cards, generating data representative of each of the identified cards, generating initial gaming actions for the plurality of player computing devices, wherein at least a portion of the initial gaming actions includes one or more common cards from the identified cards, transmitting the data representative of cards in the initial gaming actions to the plurality of player computing devices, the first player computing device, and the second player computing device, wherein the plurality of player computing devices are configured to, based on the data, provide an electronic gaming experience comprising a game that corresponds to a type of game selected by players associated with the plurality of player computing devices, wherein the first player computing device is configured to provide an electronic gaming experience comprising a game of a first type and the second player computing device is configured to provide an electronic gaming experience comprising a game of a second type using the same data representative of the cards in the initial gaming actions, receiving, from the plurality of player computing devices, gaming actions based on providing the electronic gaming experience comprising the game at the plurality of player computing devices, determining gaming outcomes for the players of the plurality of player computing devices based on the type of game selected by the players, the data representative of the at least one of the identified cards, and the gaming actions, and transmitting the gaming outcomes for the players to the plurality of player computing devices.

20. The electronic gaming system of claim 19, wherein: transmitting the data representative of the cards in the initial gaming actions to the plurality of player computing devices causes the plurality of player computing devices to each present, in a respective graphical user interface (GUI) display, an electronic representation of the cards in the initial gaming actions and at least one selectable option to perform a gaming action in the game.

* * * * *